United States Patent
Bartier et al.

(10) Patent No.: US 12,052,782 B2
(45) Date of Patent: Jul. 30, 2024

(54) UNICAST DISCOVERY OF FORWARDERS IN A MULTICAST GROUP

(71) Applicant: Itron Global SARL, Liberty Lake, WA (US)

(72) Inventors: Jérôme Bartier, Edinburgh (GB); Fabrice Monier, Bry sur Marne (FR)

(73) Assignee: ITRON, Global Sarl, Liberty Lake, WA (US)

( * ) Notice: Subject to any disclaimer, the term of this patent is extended or adjusted under 35 U.S.C. 154(b) by 717 days.

(21) Appl. No.: 17/133,241

(22) Filed: Dec. 23, 2020

(65) Prior Publication Data

US 2022/0201784 A1    Jun. 23, 2022

(51) Int. Cl.
*H04W 76/15* (2018.01)
*H04L 45/122* (2022.01)
(Continued)

(52) U.S. Cl.
CPC .......... *H04W 76/15* (2018.02); *H04L 45/122* (2013.01); *H04L 12/1886* (2013.01); *H04L 67/12* (2013.01);
(Continued)

(58) Field of Classification Search
CPC ....... H04W 76/15; H04W 84/18; H04W 4/06; H04W 4/70; H04L 45/122; H04L 12/1886; H04L 67/12
See application file for complete search history.

(56) References Cited

U.S. PATENT DOCUMENTS

| 7,184,421 B1 | 2/2007 | Liu et al. |
| 8,144,708 B1 * | 3/2012 | Ahmed .................. H04L 45/16 370/392 |

(Continued)

FOREIGN PATENT DOCUMENTS

| CN | 101719820 A * | 6/2010 | |
| CN | 101815287 A * | 8/2010 | .......... H04W 40/246 |

(Continued)

OTHER PUBLICATIONS

Park et al., Query-based ZigBee Mesh Routing Protocol (EPO website English translation of KR20090034111A), Apr. 2009, whole document (Year: 2009).*

(Continued)

*Primary Examiner* — Michael Thier
*Assistant Examiner* — Jose L Perez
(74) *Attorney, Agent, or Firm* — Artegis Law Group, LLP

(57) ABSTRACT

One embodiment of the present invention sets forth a technique for establishing communications within a multicast group of nodes included in a mesh network. The technique includes receiving a first unicast message that includes a multicast join request from a member node included in the multicast group, wherein the multicast join request specifies a first shortest path from the member node to a multicast group leader also included in the multicast group. The technique also includes forwarding the first unicast message to the multicast group leader along the first shortest path, and forwarding a second unicast message from the multicast group leader to the member node along a second shortest path, wherein the second unicast message includes a multicast join acknowledgment. The technique further includes declaring a first node as a multicast forwarder in the multicast group, wherein the first node is responsible for forwarding the second unicast message.

20 Claims, 13 Drawing Sheets

(51) Int. Cl.
    *H04L 12/18*     (2006.01)
    *H04L 67/12*     (2022.01)
    *H04W 4/06*     (2009.01)
    *H04W 4/70*     (2018.01)
    *H04W 84/18*     (2009.01)

(52) U.S. Cl.
    CPC ............... *H04W 4/06* (2013.01); *H04W 4/70* (2018.02); *H04W 84/18* (2013.01)

(56) References Cited

U.S. PATENT DOCUMENTS

| | | | |
|---|---|---|---|
| 8,667,173 B2 | 3/2014 | McCanne | |
| 10,491,411 B2 | 11/2019 | Bartier et al. | |
| 10,652,036 B2 | 5/2020 | Bartier et al. | |
| 10,958,460 B2 | 3/2021 | Taylor et al. | |
| 2005/0232281 A1* | 10/2005 | Rosenzweig | H04W 76/40 370/400 |
| 2008/0095163 A1* | 4/2008 | Chen | H04L 45/16 370/392 |
| 2008/0170550 A1* | 7/2008 | Liu | H04L 49/602 370/338 |
| 2009/0052449 A1 | 2/2009 | Ramakrishnan et al. | |
| 2009/0116393 A1 | 5/2009 | Hughes et al. | |
| 2009/0161594 A1* | 6/2009 | Zhu | H04L 12/18 370/312 |
| 2009/0201844 A1* | 8/2009 | Bhatti | H04W 4/06 370/312 |
| 2009/0303902 A1 | 12/2009 | Liu et al. | |
| 2013/0182566 A1 | 7/2013 | Goergen et al. | |
| 2015/0146603 A1* | 5/2015 | Wu | H04L 65/611 370/312 |
| 2015/0358226 A1* | 12/2015 | Liu | H04W 28/065 370/390 |
| 2016/0191257 A1 | 6/2016 | Garcia-Luna-Aceves | |
| 2017/0070941 A1 | 3/2017 | Veillette | |
| 2019/0165962 A1* | 5/2019 | Bartier | H04L 45/24 |
| 2022/0046515 A1* | 2/2022 | Zhang | H04W 40/30 |

FOREIGN PATENT DOCUMENTS

| | | | | |
|---|---|---|---|---|
| CN | 107333314 A | * | 11/2017 | ............ H04W 40/04 |
| CN | 109195229 A | * | 1/2019 | |
| KR | 20090034111 A | * | 4/2009 | ............ H04L 45/122 |
| KR | 1430736 B1 | * | 8/2014 | |
| WO | WO-0001115 A1 | * | 1/2000 | ............ H04L 12/185 |

OTHER PUBLICATIONS

Wikipedia, Time to live, Dec. 14, 2020, web.archive.org/web/20201214191405/https://en.wikipedia.org/wiki/Time_to_live, whole document (Year: 2020).*
Lee et al., Wireless sensor network routing method and routing system based on tree network (translation of CN 101815287 A), Aug. 24, 2010, SIPO, whole document (Year: 2010).*
Guangzhou, translation of CN109195229, Jan. 11, 2019, SIPO, whole document (Year: 2019).*
Rao et al., translation of CN 107333314, Nov. 7, 2017, SIPO, whole document (Year: 2017).*
Hwang et al., translation of KR1430736, Aug. 14, 2014, KIPO, whole document (Year: 2014).*
Wang, translation of CN 101719820, Jun. 2, 2010, SIPO, whole document (Year: 2010).*
Notice of Allowance received for U.S. Appl. No. 17/133,252, dated May 1, 2023, 5 pages.
Non Final Office Action received for U.S. Appl. No. 17/133,252, dated Mar. 14, 2022, 20 pages.
Darehshoorzadeh et al., "A New Multicast Opportunistic Routing Protocol for Wireless Mesh Networks", 12 pages.
Cain et al., "Internet Group Management Protocol, Version 3", https://datatracker.ietf.org/doc/html/rfc3376, 53 pages.
Vida et al., "Multicast Listener Discovery Version 2 (MLDv2) for IPV6", https://datatracker.ietf.org/doc/html/rfc3810, 62 pages.
Hui et al., "Multicast Protocol for Low-Power and Lossy Networks (MPL)", https://datatracker.ietf.org/doc/html/rfc7731, 29 pages.
ZigBee Specification, The ZigBee Specification describes the infrastructure and services available to applications operating on the ZigBee platform, https://zigbeealliance.org/wp-content/uploads/2019/11/docs-05-3474-21-0csg-zigbee-specification.pdf, 565 pages.
Darehshoorzadeh et al., "A New Multicast Opportunistic Routing Protocol for Wireless Mesh Networks", https://core.ac.uk/download/pdf/41826948.pdf, 9 pages.
Oikonomou et al., "Stateless multicast forwarding with RPL in 6LowPAN sensor networks", figshare. https://hdl.handle.net/2134/12227, https://repository.lboro.ac.uk/articles/conference_contribution/Stateless_multicast_forwarding_with_RPL_in_6LowPAN_sensor_networks/9404567, 8 pages.
International Search Report for Application No. PCT/US2021/064218 dated Mar. 8, 2022.
Final Office Action received for U.S. Appl. No. 17/133,252, dated Sep. 28, 2022, 12 pages.

* cited by examiner

UNICAST DISCOVERY OF FORWARDERS IN A MULTICAST GROUP

BACKGROUND

Field of the Various Embodiments

Embodiments of the present disclosure relate generally to computer science and networking, and more specifically, to unicast discovery of forwarders in a multicast group.

Description of the Related Art

A conventional utility distribution infrastructure typically includes multiple consumers (e.g., houses, business, etc) coupled to a set of intermediate distribution entities. The distribution entities draw resources from upstream providers and distribute the resources to the downstream consumers. In a modern utility distribution infrastructure, the consumers and/or intermediate distribution entities may include Internet-of-Things (IoT) devices, such as smart utility meters and other network-capable hardware. Among other things, these IoT devices measure the consumption levels of various resources to generate related metrology data and periodically report the metrology data across the Internet and/or other networks to a centralized management facility, often referred to as the "back office."

In many cases, the back office performs various management operations for the utility distribution infrastructure on behalf of one or more customers. For example, a customer could include a utility company or another corporate entity that owns and/or operates all of or part of the utility distribution infrastructure. Typically, the back office periodically collects metrology data associated with the utility distribution infrastructure and provides that data to customers. For example, the back office could obtain metrology data from a set of IoT devices every eight hours indicating utility consumption over an eight-hour interval. The back office also occasionally initiates on-demand read requests to read metrology data from one or more specific IoT device at the behest of the customer. For example, the customer could require a final utility meter reading from a smart utility meter located at a recently sold residence to prorate a utility bill. In such a situation, the back office would transmit an on-demand read request to that smart meter to cause the smart meter to report the current meter reading.

In some implementations, instead of communicating with one another indirectly through the back office, a group of IoT devices may establish an ad hoc mesh network to enable more direct device-to-device communications. Such a mesh network is typically formed by establishing communication links between pairs of IoT devices that reside relatively close to one another. The mesh network is then used by the IoT devices to exchange and/or aggregate metrology data, propagate commands, and/or participate in other local decisions or actions. These types of direct communications among IoT devices within a mesh network are normally conducted based on multicast traffic protocols within a multicast group. For example, smart meters that belong to the same transformer in a power grid could form a multicast group and communicate with one another via different multicast exchanges between members of the multicast group.

One drawback to communicating via multicast groups, however, is that IoT devices in the same multicast group may reside in different area networks (e.g., by connecting to different access points or cellular towers). In such situations, network routes between two IoT devices in the multicast group may span multiple area networks and include nodes that are not part of the multicast group. Because IoT devices in the multicast group cannot communicate with one another using network structures under which the IoT devices are organized, such as a tree-based hierarchy of IoT devices within a single area network, members of the multicast group may exchange multicast messages with one another by flooding the mesh network. However, flooding the mesh network with multicast messages causes the multicast messages to be processed and forwarded by a much larger set of nodes than is required to connect the members of the multicast group. This amount of processing and forwarding consumes a substantial amount of bandwidth in the mesh network and increases overall resource overhead on the IoT device, which can substantially reduce device battery life.

As the foregoing illustrates, what is needed in the art are more effective techniques for efficiently establishing and conducting communication among members of a multicast group that reside across multiple networks.

SUMMARY

One embodiment of the present invention sets forth a technique for establishing communication within a multicast group of nodes included in a mesh network. The technique includes receiving a first unicast message that includes a multicast join request from a member node included in the multicast group, wherein the multicast join request specifies a first shortest path from the member node to a multicast group leader also included in the multicast group. The technique also includes forwarding the first unicast message to the multicast group leader along the first shortest path, and forwarding a second unicast message from the multicast group leader to the member node along a second shortest path, wherein the second unicast message includes a multicast join acknowledgment. The technique further includes declaring a first node that forwarded the second unicast message as a multicast forwarder in the multicast group.

One technical advantage of the disclosed techniques relative to the prior art is that the disclosed techniques enable a minimum set of multicast forwarders to be identified within a multicast group, where the multicast forwarders in that minimum set are able to connect all member nodes included in the multicast group. Accordingly, the disclosed techniques are able to reduce bandwidth consumption and overall processing overhead typically associated with conventional approaches. The disclosed techniques also transmit unicast messages during the multicast discovery process when possible, which further reduces bandwidth consumption and processing overhead. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
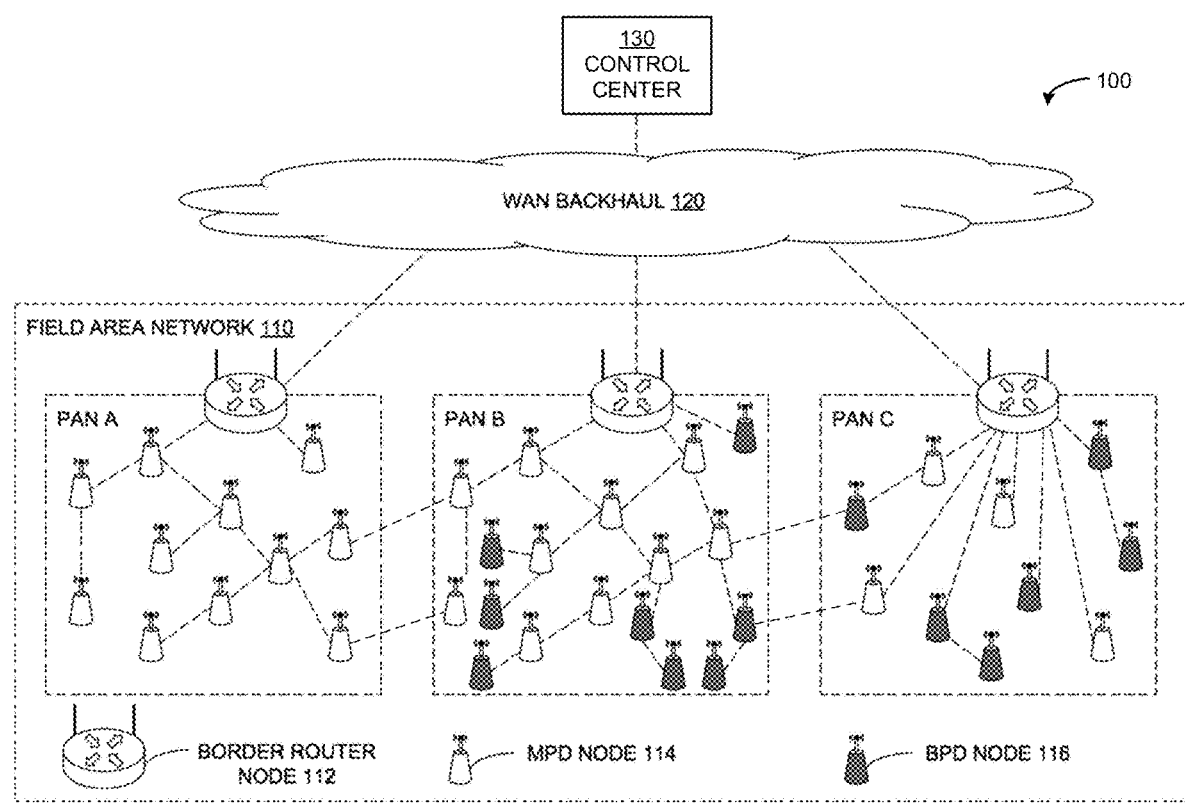
FIG. 1 illustrates a network system configured to implement one or more aspects of various embodiments.

FIG. 1 illustrates a network system 100 configured to implement one or more aspects of various embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. It will be appreciated that PANs A, B, or C can be organized according to other network topologies or structures. For example, one or more PANs could be configured in a tree-like network structure, such as a Destination Oriented Directed Acyclic Graph (DODAG) with parent nodes, child nodes, and a root node.

Each of PANs A, B, and C includes at least one border router node 112 and one or more mains powered device (MPD) nodes 114. PANs B and C further include one or more battery powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. MPD nodes 114 and BPD nodes 116 are configured to gather sensor data, process the sensor data, and communicate data processing results and other information to control center 130. Border router nodes 112 operate as access points to provide MPD nodes 114 and BPD nodes 116 with access to control center 130.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein. However, these routes are generally not known by the nodes unless a dedicated protocol is implemented by the nodes, in addition to the protocol used to manage each PAN. Conversely, routes that link nodes within a given PAN are typically known (e.g., via the protocol used to manage the PAN) by the nodes in the PAN and allow nodes within the PAN to communicate with one another.

Control center 130 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Any of border router nodes 112, MPD nodes 114, and BPD nodes 116 additionally include functionality to communicate directly with one or more adjacent nodes via bi-directional communication links. The communication links may be wired or wireless links, although in practice, adjacent nodes of a given PAN or across multiple PANs exchange data with one another by transmitting data packets via wireless radio frequency (RF) communications.

Each node within a given PAN may implement a discovery protocol to identify one or more adjacent nodes, or "neighbors." A node that has identified a spatially adjacent, neighboring node may establish a bi-directional communication link with the neighboring node. For example, a node that is discovered another node could exchange media access control (MAC) addresses and schedule future communications with the other node based on those MAC addresses. Each neighboring node could update a respective neighbor table to include information concerning the other node, including the MAC address of the other node as well as a received signal strength indication (RSSI) of the communication link established with that node.

In one embodiment, nodes may implement the discovery protocol to determine the hopping sequences of adjacent nodes. The hopping sequence of a node is the sequence of RF channels across which the node periodically receives data. As is known in the art, a channel may correspond to a particular range of frequencies.

Once adjacency is established between nodes, any of those nodes can communicate with any of the other nodes via one or more intermediate nodes and one or more communications links associated with the intermediate node (s). In other words, communication links between adjacent nodes that have discovered one another may be used by the nodes to form a mesh network, independent of network topologies or structures associated with individual PANs A, B, or C. Nodes in the mesh network may additionally communicate with one another via the communication links in the mesh network instead of relying on the network structures and/or connections in WAN backhaul 120 or PANs A, B, or C. For example, communications links established between one or more nodes in PAN A and one or more nodes in PAN B, and between one or more nodes in PAN B and one or more nodes in PAN C, could be used to transmit Internet protocol (IP) packets, command messages, metrology data, and/or other technically feasible data units between or among nodes in the mesh network without routing the data through WAN backhaul 120.

In some embodiments, a subset of nodes in the mesh network is added to a multicast group to communicate specific information with one another. Membership of nodes in the multicast group may additionally be independent of the grouping of nodes under multiple PANs A, B, and C. For example, nodes that include smart meters grouped under the same transformer in a power grid could form a multicast group and communicate with one another by transmitting multicast messages within the multicast group. These multicast messages could be used by the nodes to exchange or aggregate metrology data, propagate commands, or carry out other decisions or actions while minimizing or avoiding communication with control center 130.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse to reach the destination node. In one embodiment, each intermediate node may include a forwarding database indicating various network routes and cost metrics associated with each route.

Figure 2:
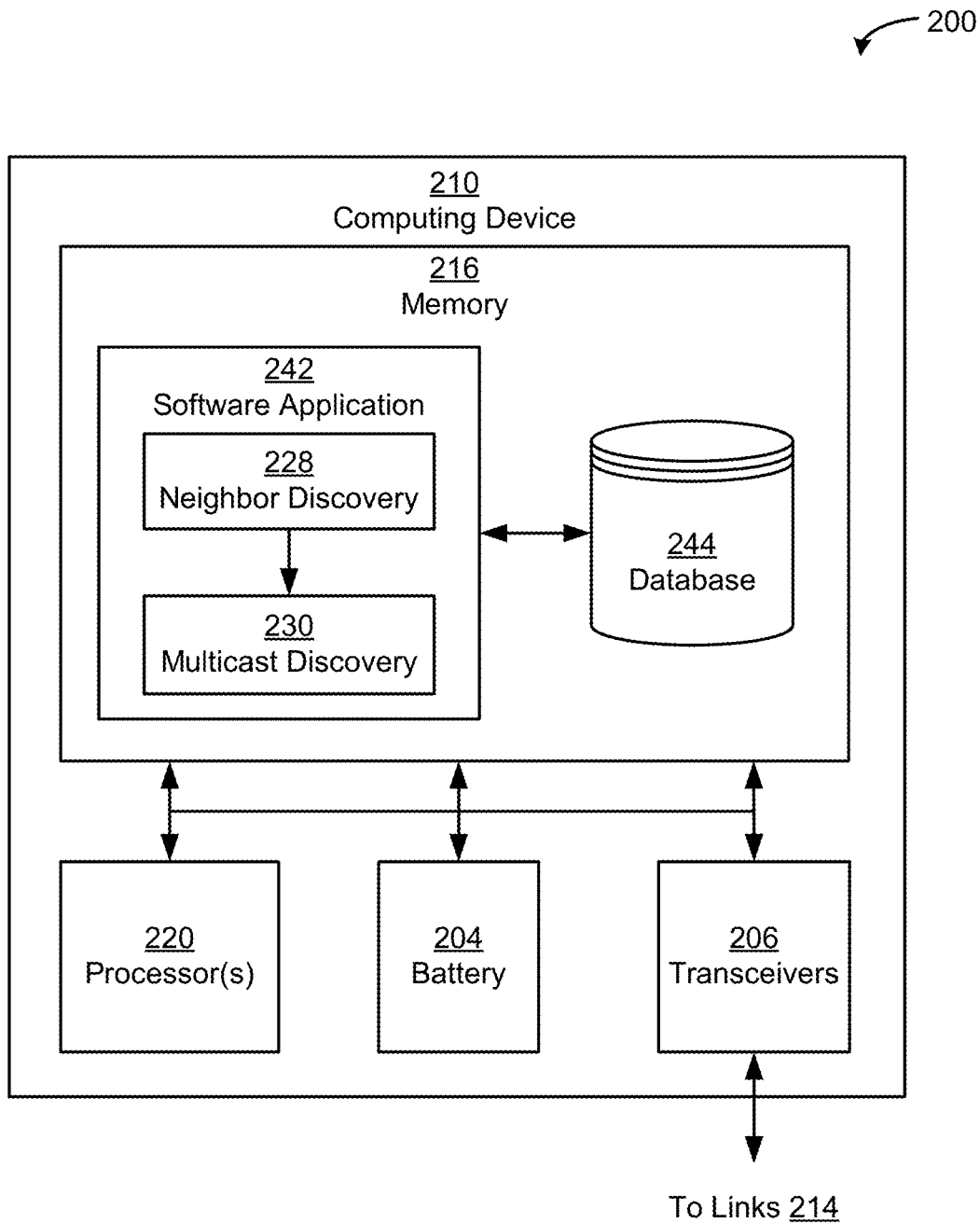
FIG. 2 illustrates a node configured to transmit and receive data within the network system of FIG. 1, according to various embodiments.

Nodes may include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary node that may operate within the network system 100.

FIG. 2 illustrates a node 200 configured to transmit and receive data within the mesh network of FIG. 1, according to various embodiments. Node 200 may be used to implement any of border router nodes 112, MPD nodes 114, and BPD nodes 116 of FIG. 1.

As shown, a node 200 includes a computing device 210. Computing device 210 includes one or more processors 220, a battery 204, one or more transceivers 206, and a memory 216 coupled together. Processors 220 may include any hardware configured to process data and execute software applications. For example, processors 202 could include one or more central processing units (CPUs), graphics processing units (CPUs), application-specific integrated circuit (ASICs), field programmable gate array (FPGAs), artificial intelligence (AI) accelerators, microprocessors, microcontrollers, other types of processing units, and/or a combination of different processing units (e.g., a CPU configured to operate in conjunction with a GPU).

Transceivers 206 are configured to transmit and receive data packets across network system 100 using a range of channels and power levels. Each transceiver includes one or more radios implemented in hardware and/or software to provide two-way RF communication with other nodes in network system 100 via one or more communications links 214. Transceivers 206 may also, or instead, include a cellular modem that is used to transmit and receive data with a cellular base station via a corresponding link.

Battery 204 supplies power to processors 220, transceivers 206, memory 216, and/or other components of computing device 210. For example, battery 204 could include sufficient capacity to allow computing device 210 to operate for a number of years without replacement and/or recharging. In some embodiments, power from battery 204 is supplemented with or replaced by a mains power supply, a solar panel, and/or another power source.

Memory 216 includes one or more units that store data and/or instructions. For example, memory 216 could include a random access memory (RAM) module, a flash memory unit, and/or another type of memory unit. Processors 220, transceivers 206, and/or other components of node 112 include functionality to read data from and write data to memory 116. Memory 216 includes software application 222, which includes program code that, when executed by one or more processors 220, performs any of the operations discussed herein.

In operation, software application 242 performs a neighbor discovery 228 process discussed above in conjunction with FIG. 1 in order to establish adjacency with one or more neighboring nodes in a mesh network. Software application 242 may generate a neighbor table that indicates node adjacency and other data related to the nodes in the mesh network and store the neighbor table in database 244.

Software application 242 may also store, in database 244 and/or memory 216, data related to one or more roles within multicast groups of nodes in the mesh network. These roles include, but are not limited to, a multicast group leader of a multicast group, a multicast group member of the multicast group, and/or a multicast forwarder that propagates multicast messages among members of the multicast group. The roles of multicast leader and multicast group members for a given multicast group may be added to database 244 and/or memory 216 based on a configuration by control center 130, a multicast group membership discovery protocol, and/or another technically feasible technique.

In some embodiments, software application 242 participates in a multicast discovery 230 process with neighboring nodes identified during neighbor discovery 228. During multicast discovery 230, a subset of nodes in the mesh network is assigned the role of multicast forwarder for a given multicast group. Multicast messages may then be transmitted among the members of the multicast group along paths that include the multicast forwarders. In other words, multicast discovery 230 may be used to establish communication within the multicast group using links 214 between adjacent nodes instead of requiring coordination with control center 130 and/or another central agent or utilizing tree-based network structures under which the nodes are organized.

More specifically, multicast discovery 230 may include a three-way handshake that is initiated by the multicast group leader of the multicast group. The three-way handshake includes a multicast advertisement message from the multicast group leader to members of the multicast group, multicast join requests from the members to the multicast group leader, and a multicast acknowledgment from the leader to each member from which a multicast join request was received. Data that is accumulated and transmitted during the three-way handshake may then be used to select multicast forwarders for the multicast group, as discussed in further detail below with respect to FIGS. 3A-3D. To reduce processing overhead and/or bandwidth consumption during multicast discovery 230, unicast messages may be used during one or more steps of the three-way handshake.

When a node fails to receive a unicast message during the three-way handshake, multicast discovery 230 may fall back to broadcast transmission of one or more messages to or from the node, as discussed in further detail below with respect to FIGS. 4A-4F. The broadcast transmission may allow multicast forwarders and paths between multicast members in the multicast group to be established in the presence of asymmetric links and/or other connectivity issues between nodes in the mesh network.

Multicast Discovery in a Mesh Network

Figure 3A:
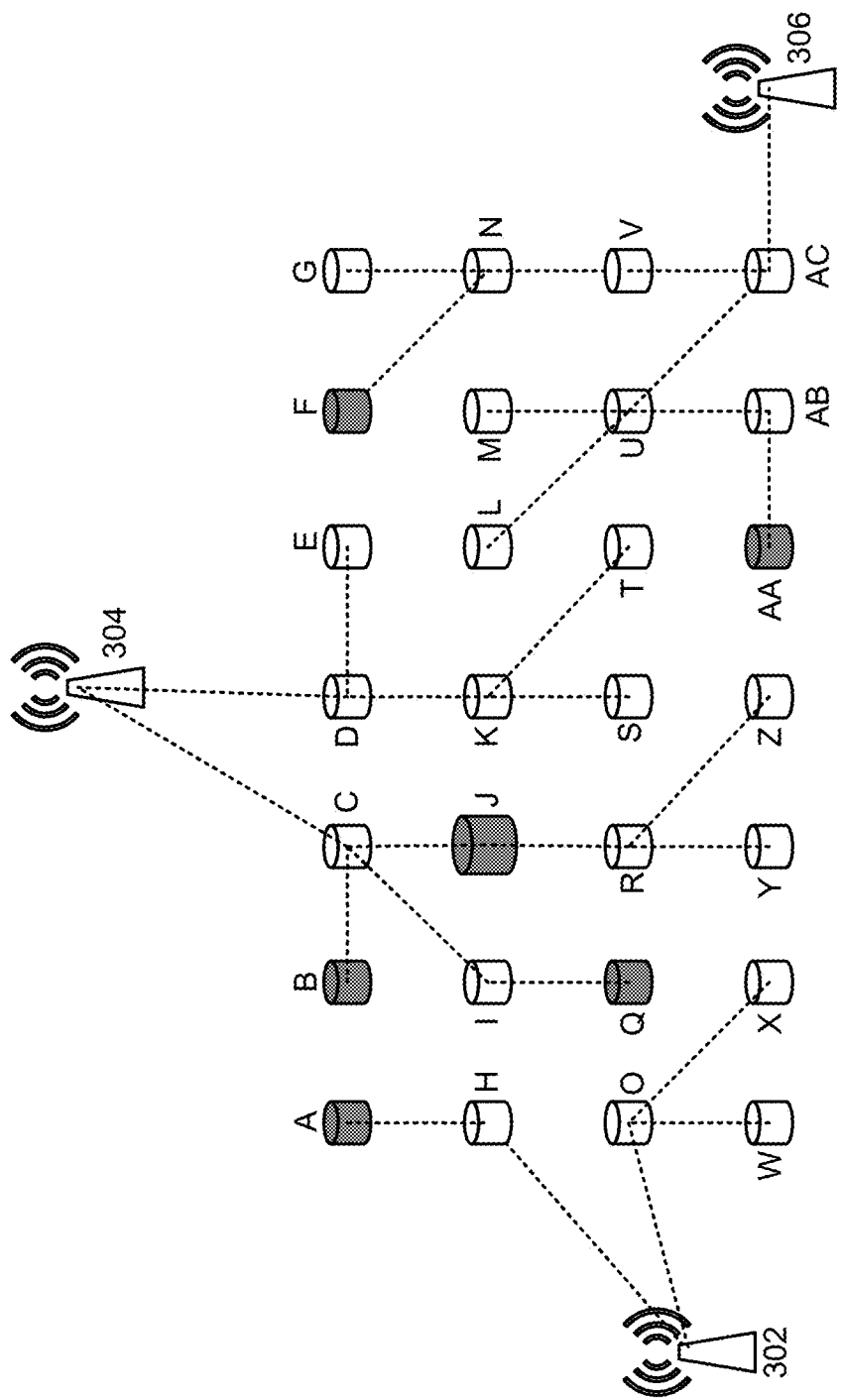
FIG. 3A illustrates an initial state of a set of nodes in an exemplar mesh network, according to various embodiments.

FIG. 3A illustrates an initial state of a set of nodes in an example mesh network, according to various embodiments. As shown, the mesh network includes 28 nodes that are grouped under three PANs. The first PAN includes nodes A, H, O, W, and X connected to a first router 302. The second PAN includes nodes B, C, D, E, I, J, K, Q, R, S, T, Y, and Z connected to a second router 304. The third PAN includes nodes F, G, L, M N, U, V, AA, AB, and AC connected to a third router 306.

Nodes in each PAN are arranged in a tree-based network structure, which includes a hierarchy of parent and child nodes. Within the first PAN, nodes H and O are children of router 302, node A is a child of node H, and nodes W and X are children of node O. Within the second PAN, nodes C and D are children of router 304; nodes B, I, and J are children of node C; nodes E and K are children of node D; node Q is a child of node I; node R is a child of node J; nodes S and T are children of node K; and nodes Y and Z are children of node R. Within the third PAN, node AC is a child of router 306; nodes U and V are children of node AC; nodes L, M, and AB are children of node U; node N is a child of node V; node AA is a child of node AB; and nodes F and G are children of node N.

Nodes that are spatially adjacent in FIG. 3A are additionally connected by communication links in the mesh network. For example, node A could include communication links with adjacent nodes B, J, and I; node J could include communication links with adjacent nodes B, C, D, I, K, Q, R, and S; and so on. A first node that is adjacent to (and thus has a direct communication link with) a second node is referred to as a direct neighbor of the second node. A given node in the mesh network is able to forward unicast and broadcast frames to the node's direct neighbors via the corresponding communication links.

Within the mesh network, nodes A, B, F, J, Q, and AA (shown as filled in FIG. 3A) are configured as members of a multicast group, and node J (shown as larger than the other nodes in FIG. 3A) is configured as the multicast group leader of the multicast group. This configuration or selection of the multicast group leader and multicast group members may be performed using a centralized entity, a discovery process, and/or another technically feasible technique.

Figure 3B:
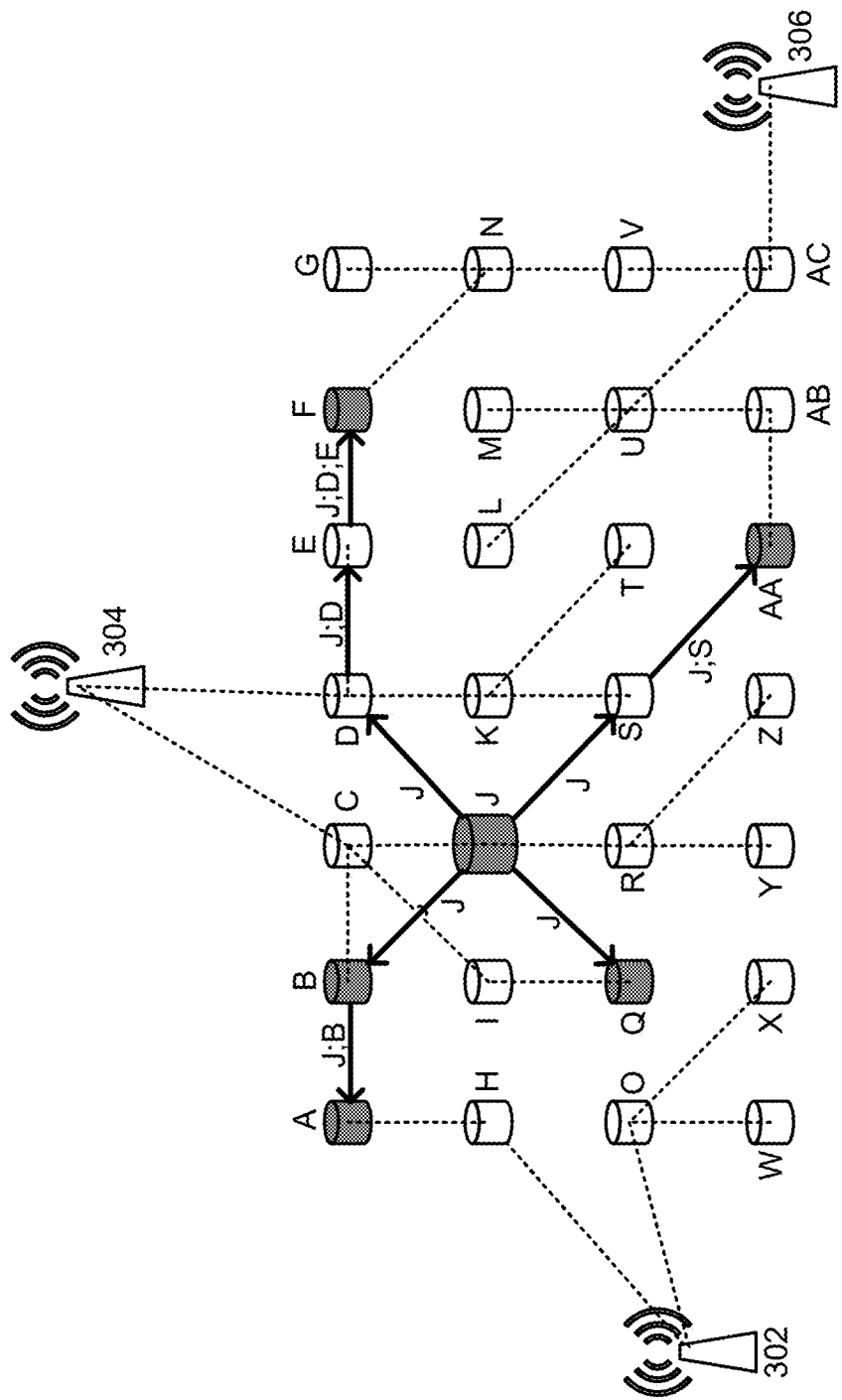
FIG. 3B illustrates a first step in a multicast discovery process performed by the set of nodes in the exemplar mesh network of FIG. 3A, according to various embodiments.

FIG. 3B illustrates a first step in a multicast discovery process performed by the set of nodes in the example mesh network of FIG. 3A, according to various embodiments. As shown, the first step includes node J broadcasting a multicast advertisement message (MAM) for the multicast group, which reaches other nodes A, B, F, Q, and AA in the multicast group. In some embodiments, node J periodically rebroadcasts a new MAM (e.g., every 30 minutes, every hour, every 12 hours, etc.) to maintain the multicast group.

First, node J generates the MAM with a maximum hop limit, a path cost, a sequence counter, and/or other metadata. In the example illustrated in FIG. 3B, the MAM is initialized using a maximum hop limit of 3 and a path cost of zero.

Next, node J forwards the MAM to all direct neighbors, which include nodes B, C, D, I, K, Q, R, and S. Each node that receives the MAM forwards the broadcast frame to all of the node's direct neighbors after a random forwarding delay. Prior to forwarding the MAM, a given node decrements the hop limit in the MAM and appends the node's network address (e.g., IP address, Media Access Control (MAC) address, etc.) to the end of an address vector in the MAM.

A given node that receives the MAM may also calculate an updated path cost based on an aggregated expected transmission count (ETX), expected transmission time (ETT), hop count, and/or another routing metric associated with transmission of the MAM from node J to the node and include the updated path cost in the MAM (in lieu of the previous path cost calculated by a neighbor node from which the MAM was received). For example, the node could calculate a link cost associated with receipt of the MAM from the neighbor and calculate the updated path cost as the sum of the link cost and the value of path cost in the MAM from the neighbor node. If more than one MAM is received by the node before the end of the forwarding delay, the node selects the address vector associated with the best path cost (e.g., based on a routing metric or combination of routing metrics) for inclusion in the MAM that is forwarded to the node's direct neighbors.

Forwarding of the MAM stops after a node receives the MAM with a hop limit of 0 and/or if the node has already and made a forwarding decision for an MAM with the same sequence counter. In some instances, a node that has already forwarded an MAM with a given sequence counter may choose to re-forward a newly received MAM with the given sequence counter when the newly received MAM is associated with a better path cost than the forwarded MAM. As the multicast group leader, node J does not forward any MAMs for the multicast group that originated from node J.

In FIG. 3B, shortest paths along which the MAM is transmitted from node J to member nodes A, B, F, Q, and AA are illustrated using arrows that connect pairs of adjacent nodes. In some embodiments, a shortest path is a path with the lowest or best path cost between two nodes. As mentioned above, this path cost may be calculated using one or more routing metrics, such as (but not limited to) hop count, ETX, ETT, bandwidth, error rate, and/or delay. Additional paths used to broadcast the MAM within the mesh network are omitted for clarity. Each arrow is additionally labeled with a representation of the address vector in the MAM, as transmitted from a first node from which the arrow originates and received by a second node at which the arrow terminates. All paths denoted by the arrows fall within the maximum hop limit of 3 from node J.

In particular, each MAM originating from node J has an address vector that includes only node J and a hop limit of 2 (since the first hop from node J to each of its direct neighbors is decremented from the maximum hop limit of 3 before the MAM is transmitted by node J). This original MAM reaches member nodes B and Q, which determine that the address vector in the MAM from node J is shorter than other address vectors in MAMs received via other paths.

Node B appends its network address to the shortest address vector in the MAM from J, decrements the hop limit in the MAM, updates the path cost in the MAM based on the link cost with J, and forwards the MAM to all direct neighbors. Node A receives the MAM from node B, which includes a hop limit of 1 and an address vector with the addresses of nodes J and B. Node A may optionally receive the MAM via other paths that fall within the maximum hop limit (e.g., via nodes C and B, nodes I and B, nodes I and H, etc.) and determine that the MAM routed through that path that includes nodes J and B has the best path cost. Node A may also transmit the MAM with a hop count of zero and an address vector that includes the addresses of nodes J, B, and A to its direct neighbors, which include nodes B, H, and I. Since node B already has an MAM from node J with a better path cost and nodes H and I are not members of the multicast group, transmission of the MAM from node A to neighboring nodes is omitted in the depiction of FIG. 3B.

The MAM also reaches nodes D and S, which are not members of the multicast group. Each of nodes D and S determines that the path cost in the original MAM from node J is better than the path costs in MAMs received via other paths. Each of nodes D and S appends their network addresses to the address vector in the MAM, decrements the hop limit in the MAM, and transmits the MAM to all direct neighbors.

Node AA receives the MAM from node S with an address vector that includes the addresses of nodes J and S and a hop limit of 1. Node AA determines that this MAM has the best path cost of all MAMs received by node AA, adds its address to the address vector, decrements the hop limit in the MAM to zero, and transmits the MAM to all direct neighbors. Since none of the direct neighbors of node AA are members of the multicast group, depictions of these transmissions are omitted in FIG. 3B.

Node E receives the MAM from node D with an address vector that includes the addresses of nodes J and D and a hop limit of 1. Node E determines that this MAM has the best path cost of all MAMs received by node E, decrements the hop limit in the MAM, and transmits the MAM to all direct neighbors. Node F receives the MAM from node E and does not further forward the MAM because the hop limit in the MAM is zero. Thus, after broadcasting of the MAM is complete, each of member nodes A, B, F, Q, and AA has an address vector with the shortest path (as determined based on path cost) to the multicast group leader of node J.

Figure 3C:
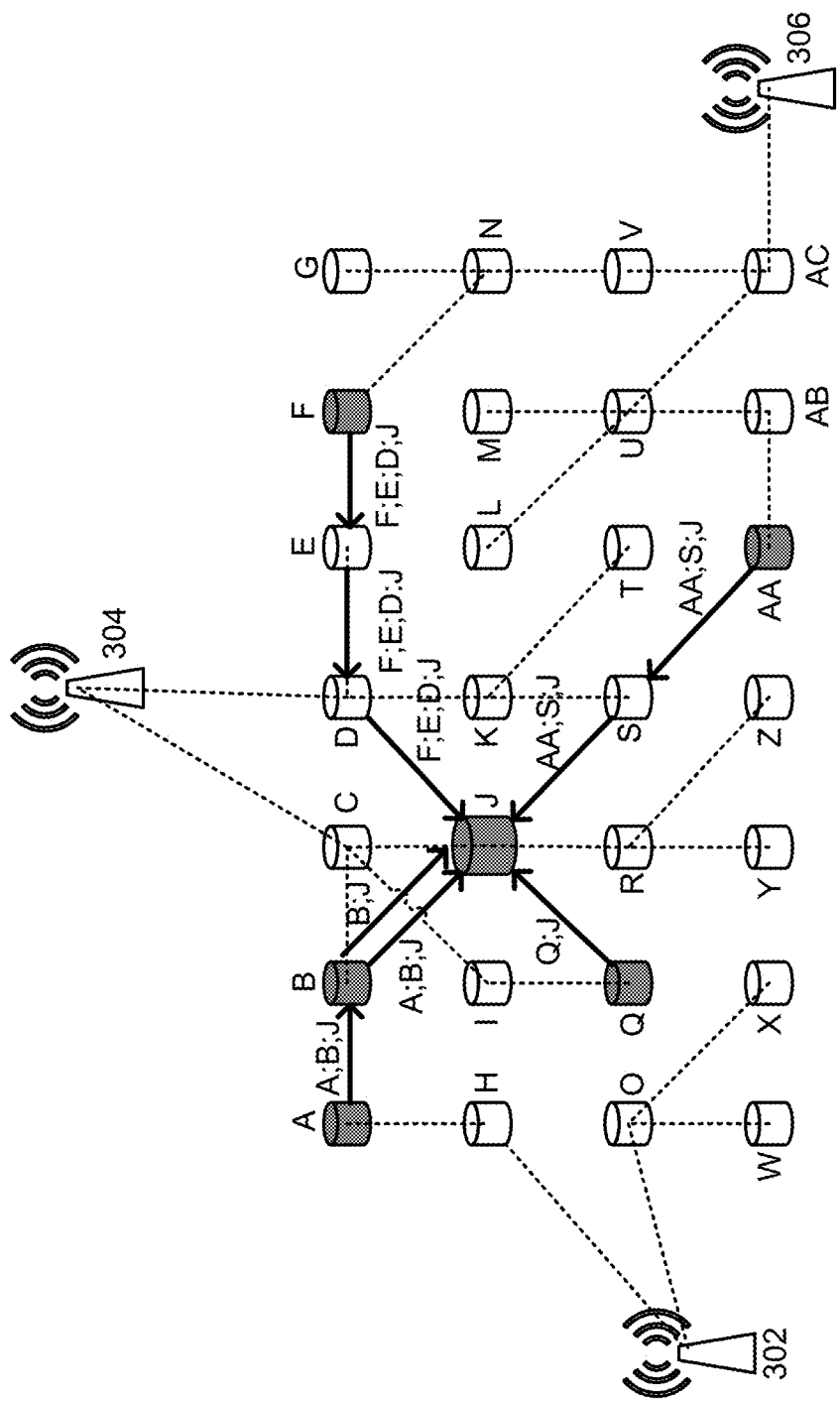
FIG. 3C illustrates a second step in a multicast discovery process performed by the set of nodes in exemplar the mesh network of FIG. 3A, according to various embodiments.

FIG. 3C illustrates a second step in a multicast discovery process performed by the set of nodes in the example mesh network of FIG. 3A, according to various embodiments. As shown, the second step includes each of member nodes A, B, F, Q, and AA responding to the MAM from node J with a multicast join request (MJR). Each MJR includes a source routing header (SRH) that specifies the route to be taken by the MJR and is transmitted via unicast along nodes with network addresses in the SRH. A member node builds the SRH using the shortest path address vector in one or more MAMs received from node J.

In general, each of member nodes A, B, F, Q, and AA creates a separate MJR with information that can be used to route the MJR to node J. A member node may create an SRH for an MJR from the member node by appending addresses to the SRH in reverse order from the shortest path MAM address vector received by the member node from node J. Each of member nodes A, B, F, Q, and AA may also add its own address to a "source" field in the frame for the MJR. If node J is adjacent to a given member node (e.g., nodes B and Q), the member node may omit the SRH and transmit the MJR as a local unicast message addressed to node J.

Using the technique described above, node A creates an SRH that includes the addresses of nodes B and J (in that order), includes the SRH in an MJR, and adds the address of node A to a separate part of the frame for the MJR. Node A transmits the MJR via unicast to node B, and node B uses the SRH in the MJR to forward the MJR to node J.

Node B creates a MJR that lacks an SRH and transmits the MJR directly to node J. Node Q similarly creates an MJR that lacks an SRH and transmits the MJR directly to node J.

Node AA creates an MJR with an SRH that includes the addresses of S and J (in that order) and includes the address of node AA in a separate part of the frame for the MJR. Node AA transmits the MJR to node S, and node S uses the SRH in the MJR to forward the MJR to node J.

Node F creates an MJR with an SRH that includes the addresses of nodes E, D, and J (in that order). Node F also adds the address of node F to a separate part of the frame for the MJR. Node F transmits the MJR to node E, and node E uses the SRH in the MJR to forward the MJR to node D. Node D then uses the SRH in the MJR to forward the MJR to node J.

Figure 3D:
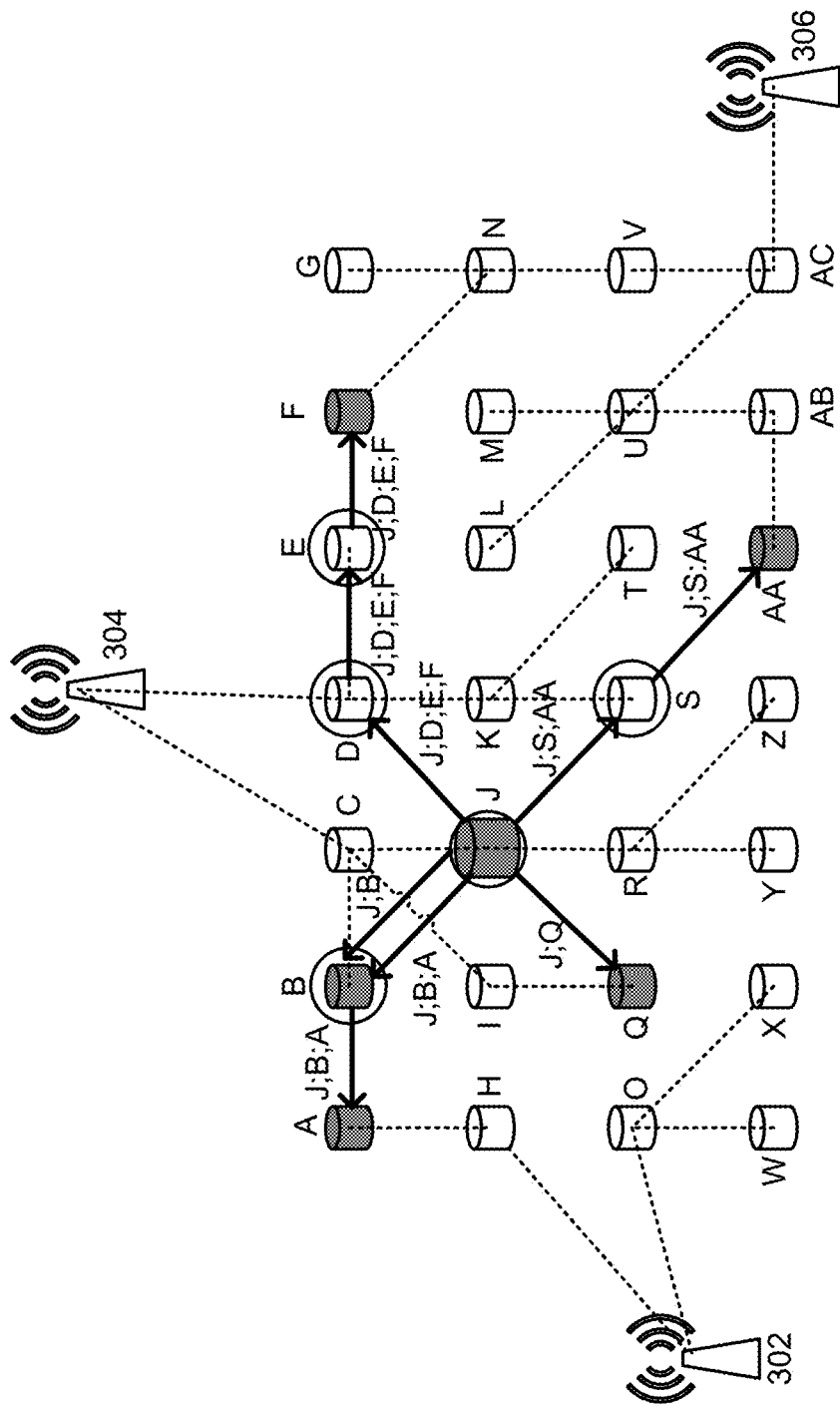
FIG. 3D illustrates a third step in a multicast discovery process performed by the set of nodes in the exemplar mesh network of FIG. 3A, according to various embodiments.

FIG. 3D illustrates a third step in a multicast discovery process performed by the set of nodes in the example mesh network of FIG. 3A, according to various embodiments. As shown, the third step includes node J responding to each MJR received in the second step of the multicast discovery process with a multicast join acknowledgment (MJA). Each MJA includes an SRH that is built by reversing the SRH of the MJR from the corresponding member node. Each MJA is additionally transmitted via unicast from node J to the corresponding member node.

Using the technique described above, node J creates a first MJA in response to the MJR from node A. The SRH in the first MJA includes the addresses of nodes B and A (in that order). Node J includes its own address in a different part of the frame for the MJA and transmits the first MJA to node B, and node B uses the SRH in the first MJA to forward the first MJA to node A.

Node J also creates a second MJA that lacks an SRH in response to the MJR from node B. Node J then transmits the second MJA directly to node B.

Node J similarly creates a third MJA that lacks an SRH in response to the MJR from node Q. Node J then transmits the third MJA directly to node Q.

Node J creates a fourth MJA in response to the MJR from node AA. The SRH in the fourth MJA includes the addresses of nodes S and AA (in that order). Node J includes its own address in a different part of the frame for the MJA and transmits the fourth MJA to node S, and node S uses the SRH in the fourth MA to forward the fourth MJA to node AA.

Node J creates a fifth MJA in response to the MJR from node F. The SRH in the fifth MJA includes the addresses of nodes D, E, and F (in that order). Node J includes its own address in a different part of the frame for the MJA and transmits the fifth MJA to node D, and node D uses the SRH in the fifth MJA to forward the fifth MJA to node E. Node E also uses the SRH in the fifth MJA to forward the fifth MJA to node F.

After an MJA has been transmitted by a given node (including the multicast group leader), the node declares itself a multicast forwarder for the multicast group. Each declared multicast forwarder may then be used to efficiently route multicast traffic among member nodes in the multicast group. As the multicast group leader, node J may maintain a list of the multicast forwarders in the multicast group and/or provide the list to other member nodes in the multicast group.

In the example of FIGS. 3A-3D, nodes B, J, D, E, and S (shown as circled in FIG. 3D) are identified as multicast forwarders for the multicast group with member nodes A, B, E, F, J, Q, and AA. These nodes form a minimum set of multicast forwarders that connects member nodes in the multicast group. As shown in FIGS. 3A-3D, member nodes in the multicast group are not all required to be multicast forwarders, and multicast forwarders for the multicast group are not all required to be member nodes in the multicast group.

A given node may additionally be declared as a multicast forwarder for a predefined duration, which is greater than the periodicity of the MAM broadcasted by node J. For example, nodes B, D, E, J, and S may declare themselves multicast forwarders for a period of 12-24 hours, while node J may broadcast a new MAM for the multicast group every 8-10 hours. This longer duration over which a given node is declared as a multicast forwarder allows multicast traffic to continue to be delivered within the multicast group while a new set of multicast forwarders is established in response to the latest MAM. Conversely, the multicast discovery process may be periodically repeated in the multicast group via the MAM/MJR/MJA handshake to maintain an up-to-date representation of member nodes in the multicast group and a set of multicast forwarders that can be used to route multicast traffic among the member nodes.

Figure 4A:
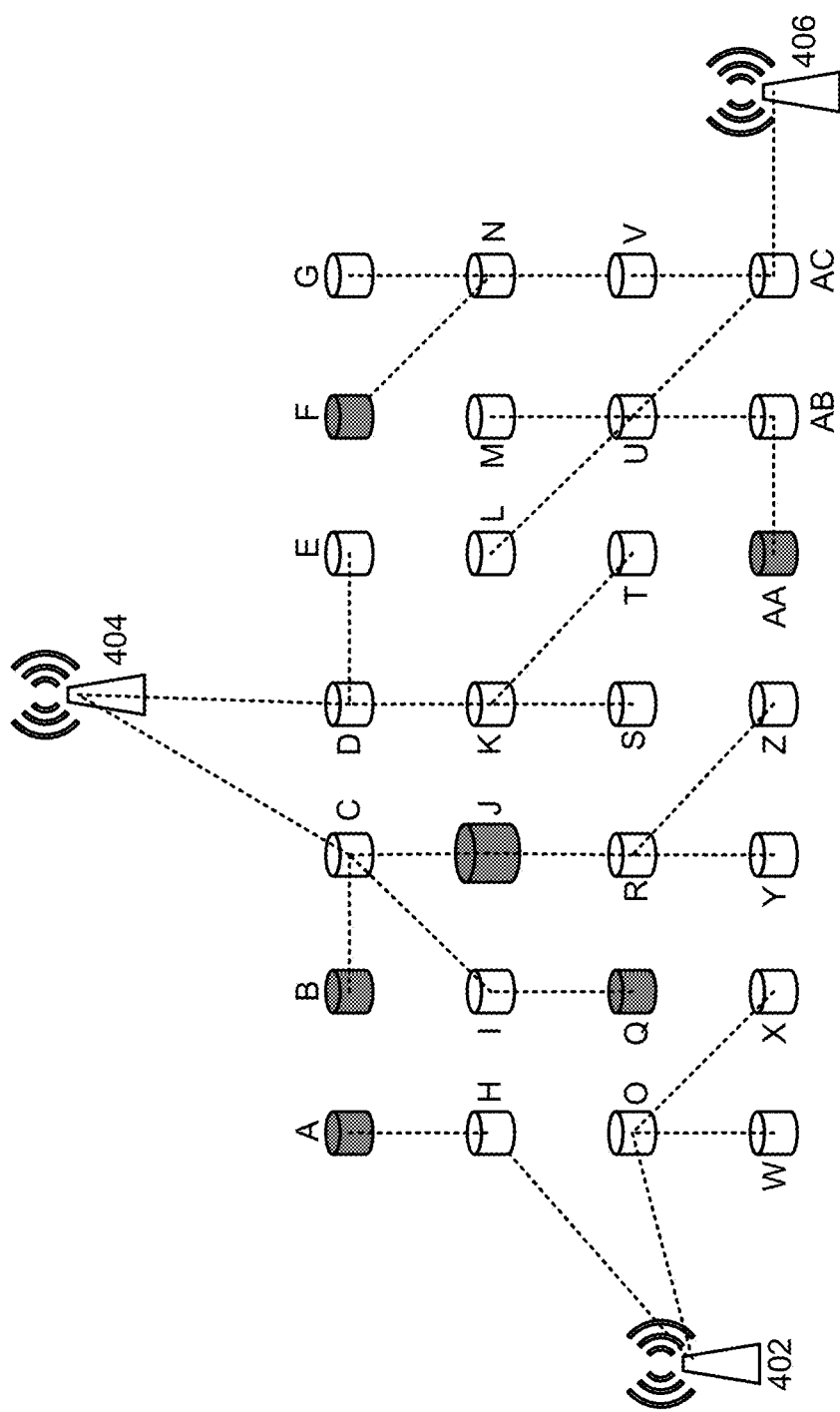
FIG. 4A illustrates an initial state of a set of nodes in an exemplar mesh network, according to other various embodiments.

FIG. 4A illustrates an initial state of a set of nodes in an example mesh network, according to other various embodiments. As shown, the example mesh network of FIG. 4A includes an initial state that is identical to the initial state of the mesh network of FIG. 3A. That is, the mesh network of FIG. 4A includes 28 nodes total grouped under three PANs. The first PAN includes nodes A, H, O, W, and X connected to a first router 402. The second PAN includes nodes B, C, D, E, I, J, K, Q, R, S, T, Y, and Z connected to a second router 404. The third PAN includes nodes F, G, L, M N, U, V, AA, AB, and AC connected to a third router 406.

Nodes within a given PAN are organized in a tree-based network structure, as described above with respect to FIG. 3A. Nodes that are spatially adjacent are also connected by communication links in the mesh network, and a first node that is adjacent to (and thus has a direct communication link with) a second node is referred to as a direct neighbor of the second node. A given node in the mesh network is able to forward unicast and broadcast frames to the node's direct neighbors via the corresponding communication links. Nodes A, B, F, J, Q, and JJ (shown as filled in FIG. 4A) are configured as members of a multicast group, and node J (shown as larger than the other nodes in FIG. 4A) is configured as the multicast group leader of the multicast group.

Figure 4B:
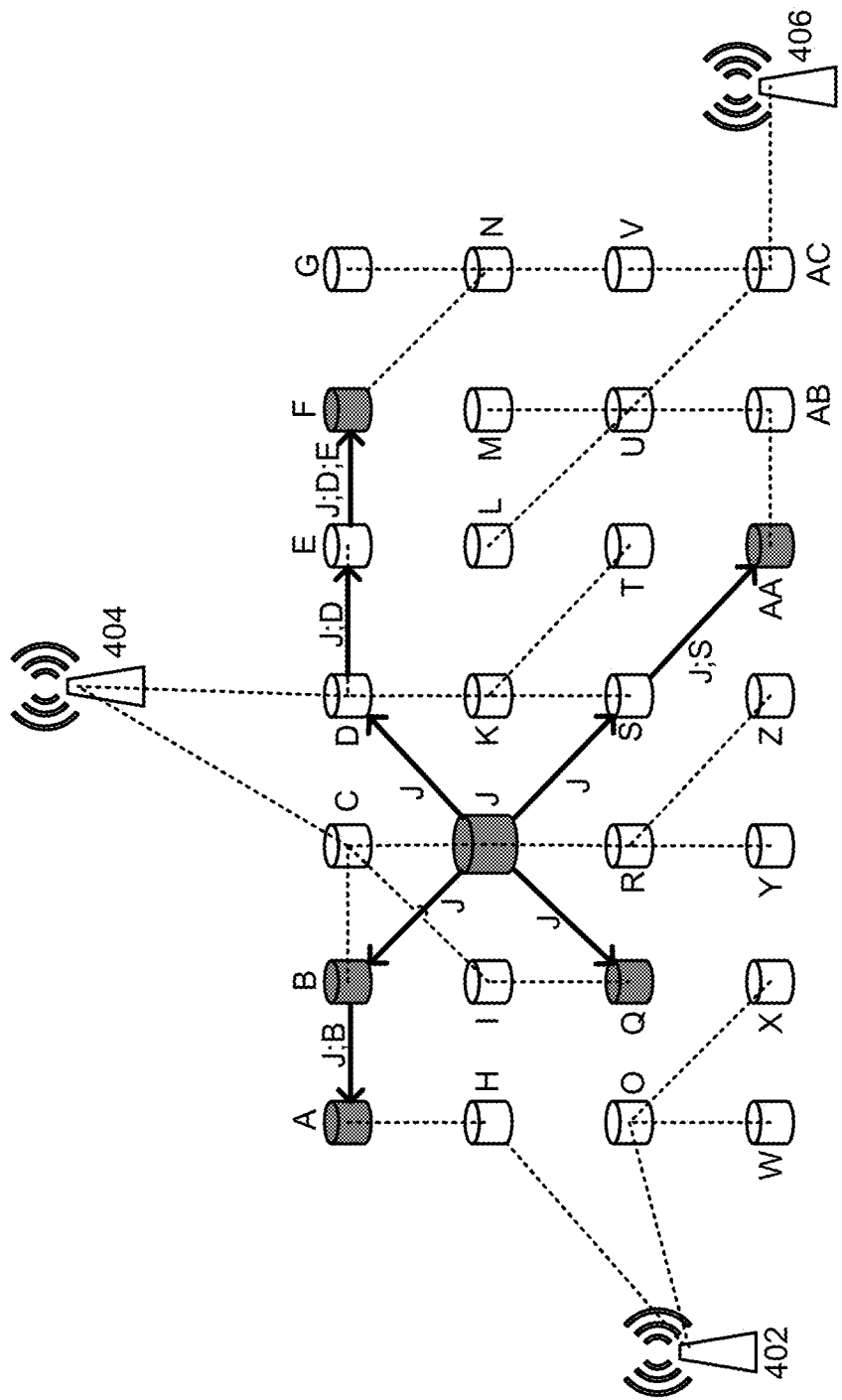
FIG. 4B illustrates a first step in a multicast discovery process performed by the set of nodes in the exemplar mesh network of FIG. 4A, according to other various embodiments.

FIG. 4B illustrates a first step in a multicast discovery process performed by the set of nodes in the example mesh network of FIG. 4A, according to other various embodiments. As shown, the first step illustrated in FIG. 4B is identical to the first step illustrated in FIG. 3B, in which node J broadcasts an MAM to other nodes in the mesh network based on a maximum hop limit and/or another routing metric. Each of member nodes A, B, F, Q, and JJ receives the MAM one or more times and identifies the shortest address vector in all MAMs received from direct neighbors.

Figure 4C:
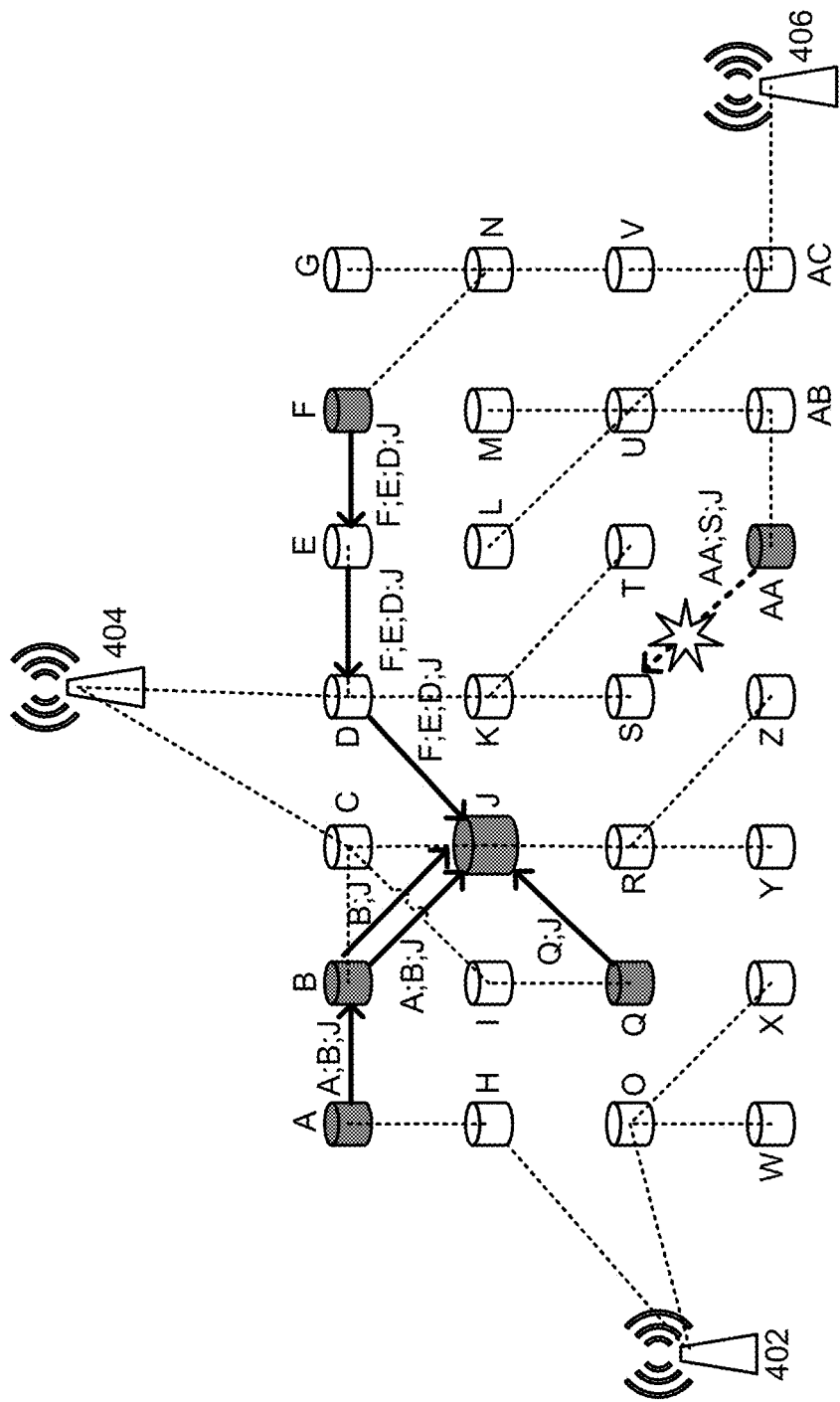
FIG. 4C illustrates a transmission failure during a second step in a multicast discovery process performed by the set of nodes in the exemplar mesh network of FIG. 4A, according to other various embodiments.

FIG. 4C illustrates a transmission failure during a second step in a multicast discovery process performed by the set of nodes in the example mesh network of FIG. 4A, according to other various embodiments. More specifically, FIG. 4C shows the second step in the multicast discovery process of FIG. 3C with a failure by node S to receive the unicast MJR from node AA. This failure may be due to an asymmetric link between nodes S and AA, which allows node AA to receive traffic from node S but prevents node S from receiving some or all traffic from node AA. The asymmetric link may be caused by noise or interference at node S (for example), which allows node S to transmit traffic to direct neighbors but may prevent node S from receiving traffic from some or all direct neighbors, such as node AA.

Because of this transmission failure, node AA may fail to receive a unicast MJA from node J in response to the unicast MJR from node AA. If node AA has not received the MJA from node J within a certain period of time, node AA may retry transmission of the unicast MJR. If node AA still has not received the unicast MJA from node J after a certain number of retries, node AA may initiate an alternative sequence of steps to complete the MAM/MJR/MJA handshake with node J, as described in further detail below with respect to FIGS. 4D-4E.

Figure 4D:
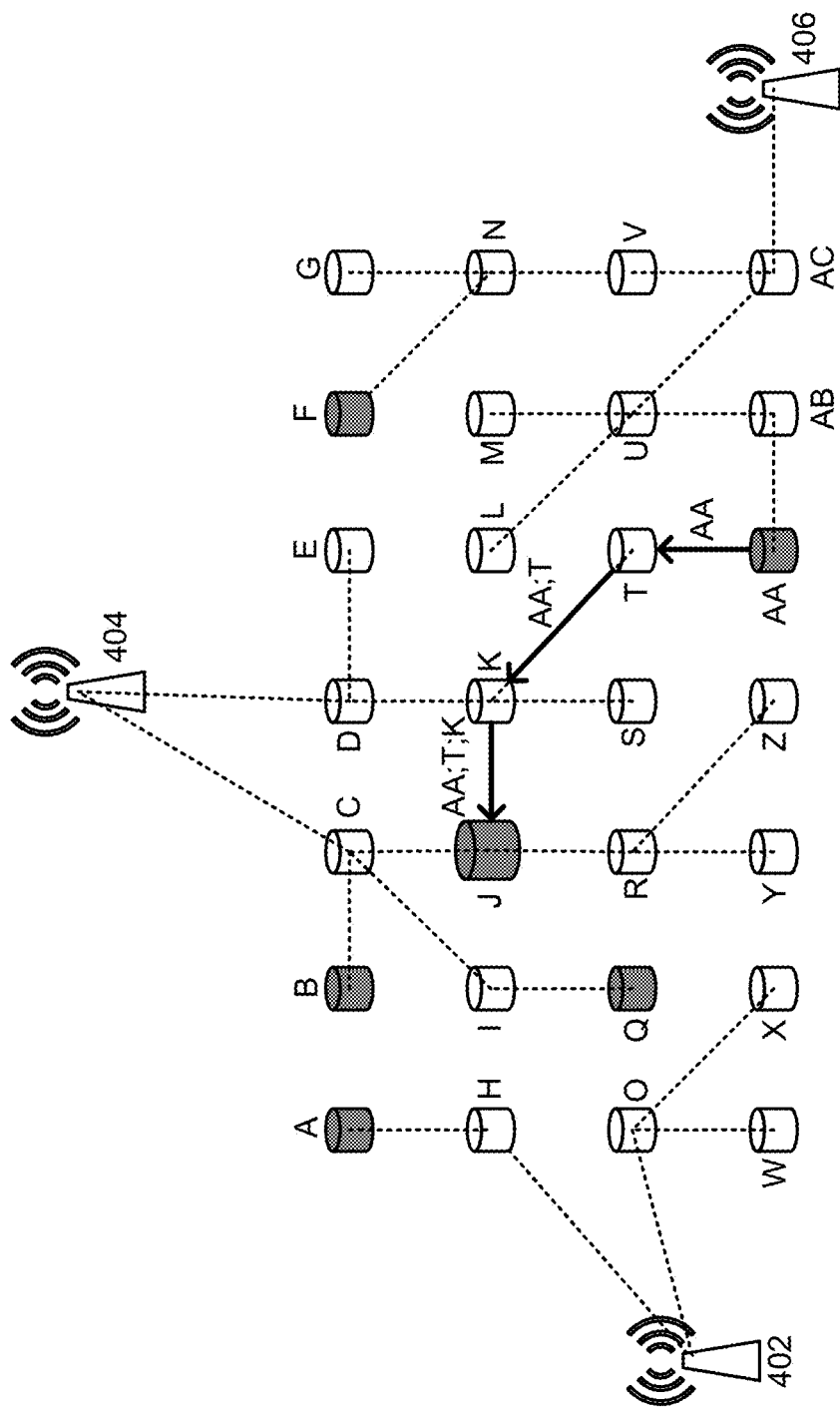
FIG. 4D illustrates a first step performed to resolve the transmission failure of FIG. 4C, according to other various embodiments.

FIG. 4D illustrates a first step performed to resolve the transmission failure of FIG. 4C, according to other various embodiments. In these embodiments, this first step involves node AA broadcasting an MJR, and the MJR reaching node J via an alternative path that does not include node S. This step may be performed by node AA after failing to receive an MJA from node J in response to a unicast MJR from node AA that is transmitted to node S. This step may also, or instead, be performed by node AA if node AA has not been able to receive a MAM from node J.

In particular, node AA may generate a broadcast MJR with a sequence counter, a maximum hop limit, a path cost, and/or other metadata. As with the examples of FIGS. 3A-3D, the maximum hop limit in the example of FIG. 4D may be set to 3, and the path cost may be initialized to zero.

If node AA has received one or more MAMs from node J, node AA may include the shortest path address vector from these MAMs in the broadcast MJR. This shortest path address vector may include the addresses of nodes J and S (in that order), assuming node AA was able to receive an MAM via the path that includes nodes J and S.

Node AA also adds a separate address vector that includes only the address of node AA to the broadcast MJR. This separate address vector is used to establish one or more new paths from node AA to node J. Node AA additionally includes a hop limit of 2 in the broadcast MJR (since the first hop from node AA to each of its direct neighbors is decremented from the maximum hop limit of 3 before the MJR is transmitted by node AA) and transmits the broadcast MJR to all direct neighbors.

As with the MAM broadcasted by the multicast group leader, each node that receives the broadcast MJR forwards the broadcast frame to all of the node's direct neighbors after a random forwarding delay. Prior to forwarding the MJR, a given node decrements the hop limit in the MJR, updates the path cost in the MJR, and appends the node's network address (e.g., IP address, Media Access Control (MAC) address, etc.) to the end of the address vector that starts with the address of node AA. If more than one MJR is received by the node before the end of the forwarding delay, the node selects the address vector that starts with the address of node AA and is associated with the best routing metric for inclusion in the MJR that is forwarded to the node's direct neighbors.

Forwarding of the broadcast MJR stops after a node receives the MJR with a hop limit of 0 and/or if the node has already and made a forwarding decision for an MJR with the same sequence counter. In some instances, a node that has already forwarded an MJR with a given sequence counter may choose to re-forward a newly received MJR with the given sequence counter when the newly received MJR is associated with a better path cost than the forwarded MJR. As the multicast group leader, node J does not forward any MJRs for the multicast group.

After forwarding of the broadcast MJR is complete, a new path with a hop count of 3 from node AA to node J is established via nodes T and K. The path is shown in arrows that connect nodes AA and T, nodes T and K, and nodes K and J. Each arrow is labeled with a representation of the shortest address vector starting with the address of node A, as transmitted from a first node from which the arrow originates and received by a second node at which the arrow terminates. Consequently, successful transmission of the broadcast MJR from node AA to node J is carried out by transmitting the broadcast MJR with an address vector that includes only the address of node AA to node T, forwarding the broadcast MJR with an updated address vector that includes the addresses of nodes AA and T (in that order) from node T to node K, and forwarding the broadcast MJR with an updated address vector that includes the addresses of nodes AA, T, and K (in that order) from node K to node J.

Node J may optionally receive the broadcast MJR via other paths that fall within the maximum hop limit (e.g., via nodes Z and R). These paths may be associated with higher path costs than the path via nodes T and K, resulting in node J identifying the path illustrated in FIG. 4D as the shortest path between node AA and node J. On the other hand, node J may fail to receive the broadcast MJR via node S because of the link asymmetry between nodes AA and S.

Figure 4E:
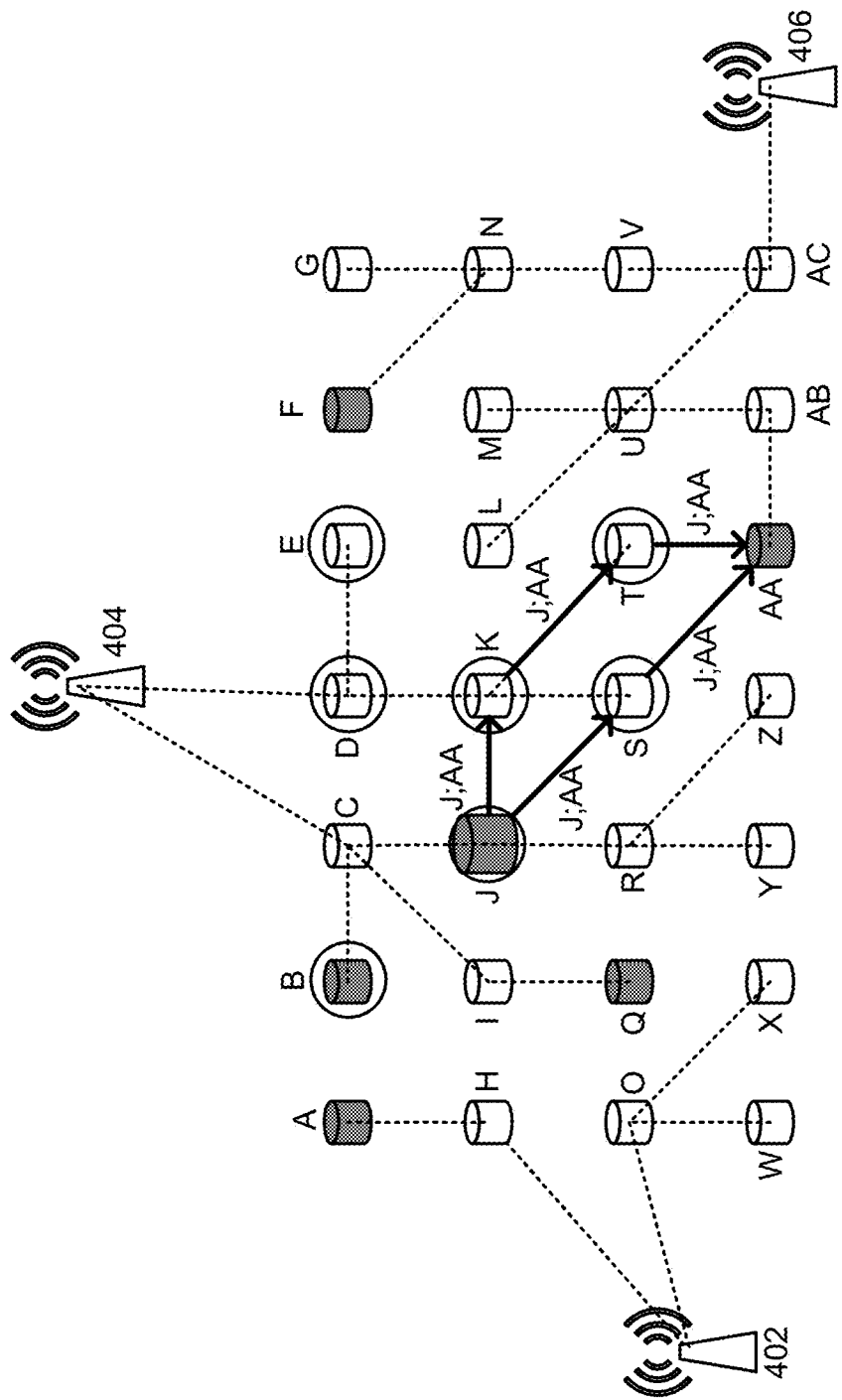
FIG. 4E illustrates a second step performed to resolve the transmission failure of FIG. 4C, according to other various embodiments.

FIG. 4E illustrates a second step performed to resolve the transmission failure of FIG. 4C, according to other various embodiments. As shown, this second step includes node J responding to the broadcast MJR from node AA with a broadcast MJA. The broadcast MJA includes a source of node J, a destination of node AA, a sequence counter, a maximum hop limit, and/or other metadata. The broadcast MJA also includes an address vector that is populated using one or more lists of addresses included in one or more address vectors of the broadcast MJR. These lists may include the shortest path address vector in the original MAM and/or the shortest path address vector in the broadcast MJR from node AA to node J. As a result, the address vector in the broadcast MJA includes node S from the original MAM, as well as nodes T and K from the broadcast MJR.

Each node that receives the broadcast MJA forwards the broadcast frame to all of the node's direct neighbors after a random forwarding delay. Prior to forwarding the MJA, a given node decrements the hop limit in the MJA. Forwarding of the broadcast MJA stops after a node receives the MJA with a hop limit of 0 and/or if the node has already made a forwarding decision for an MJA with the same sequence counter. The node may optionally re-forward a newly received MJR with the given sequence counter when the newly received MJR is associated with a better path cost than an already forwarded MJR. Moreover, node AA may omit forwarding of any broadcast MJAs for which node AA is the destination to reduce bandwidth and/or processing overhead in the mesh network.

As shown in FIG. 4E, arrows that connect pairs of nodes indicate paths along which the broadcast MJA was successfully forwarded from node AA to node J. A first path includes nodes J, K, and T (in that order), and a second path includes nodes J and S (in that order). The broadcast MJA may successfully be transmitted from node J to node AA through node S because the asymmetric link between nodes AA and S allows node S to transmit to node AA but prevents node AA from reliably transmitting to node S.

After forwarding of the broadcast MJA to node AA is complete, nodes included in the address vector of the MJA are selected as multicast forwarders. In particular, the steps performed with respect to FIGS. 4D-4E identify nodes K and T as multicast forwarders for the multicast group, in addition to nodes B, J, S, D, and E, which may already be identified as multicast forwarders via unicast transmission of MJRs and MJAs. The additional multicast forwarders solve the asymmetry issue between with nodes AA and S by allowing node AA to reach other member nodes in the multicast network via paths that do not include node S. These multicast forwarders may retransmit any multicast traffic within the multicast group, and multicast messages in the multicast group may include a sequence number and hop limit to reduce duplicate transmission of the multicast messages. These multicast forwarders may also be declared for a duration that is greater than a periodicity of the multicast advertisement message broadcasted by the multicast group leader.

In some embodiments, node J delays transmitting the broadcast MJA to node AA to answer broadcast MJRs from multiple member nodes at the same time. In these embodiments, node J aggregates address vectors, destination nodes, and/or other metadata related to the MJRs into a single broadcast message and transmits the broadcast message to neighboring nodes. The broadcast message is then propagated across the mesh network according to the technique described above, thereby allowing MJAs in the broadcast message to reach the intended recipients.

Figure 5:
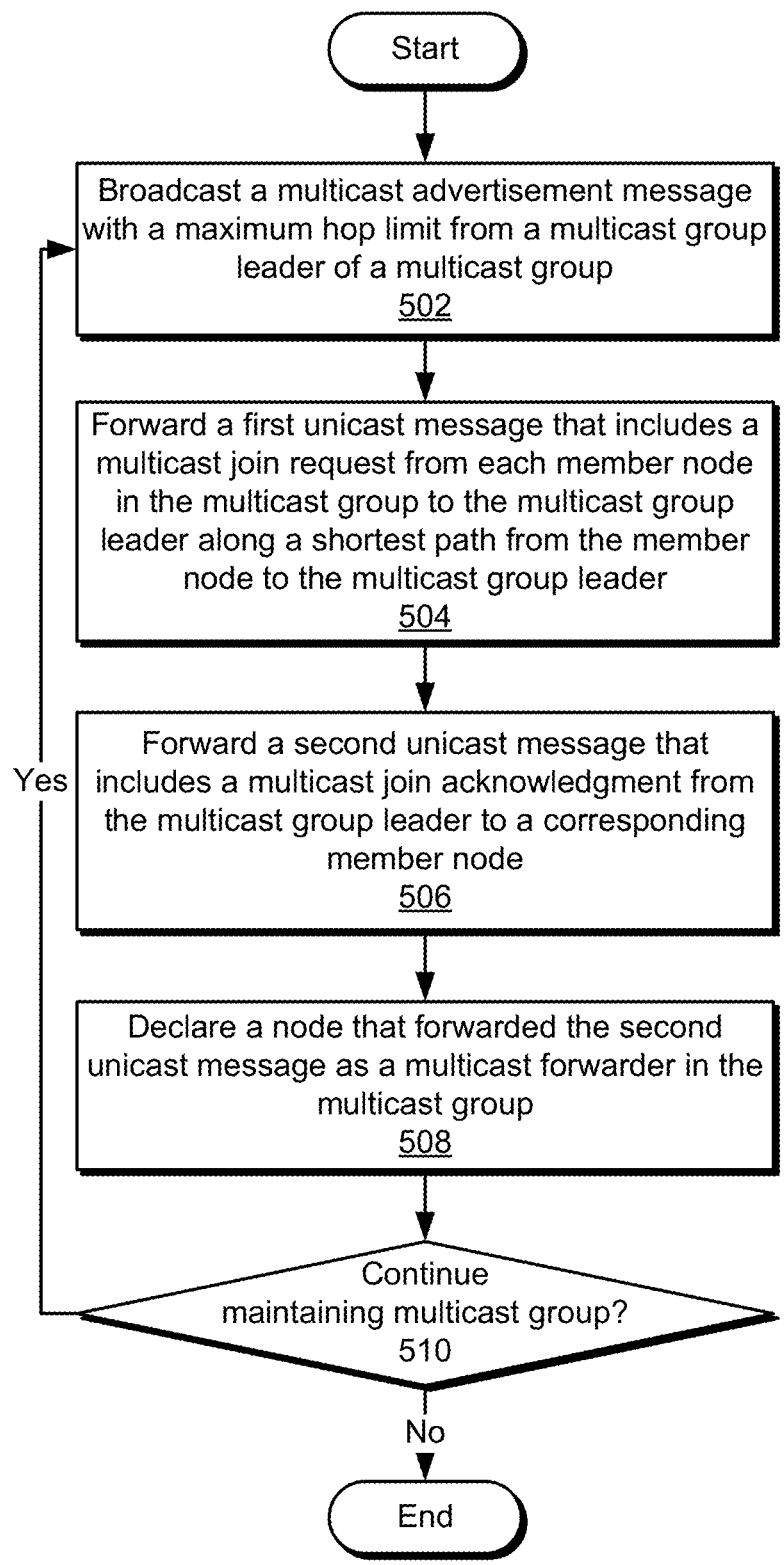
FIG. 5 is a flow diagram of method steps for establishing communications within a multicast group of nodes included in a mesh network, according to various embodiments.

FIG. 5 is a flow diagram of method steps for establishing communication within a multicast group of nodes included in a mesh network, according to various embodiments. Although the method steps are described in conjunction with the systems of FIGS. 1-4, persons skilled in the art will understand that any system configured to perform the method steps, in any order, is within the scope of the present invention.

As shown, software application 242 broadcasts 502 an MAM with a maximum hop limit from a multicast leader of a multicast group. For example, software application 242 executing on a node that is the multicast group leader could add the node's address to an address vector in the MAM, initialize a path cost in the MAM, set a hop limit in the MAM to reflect the maximum hop limit, and add a sequence counter to the MAM. Software application 242 would then forward the MAM to direct neighbors of the multicast group leader. Software application 242 executing in each node that receives the MAM would add the node's address to the address vector in the MAM, decrement the hop limit in the MAM, update the path cost in the MAM with the link cost of the previous hop, and forward the MAM to the node's direct neighbors. If multiple MAMs with the same sequence number are received at a given node, the node compares the path costs and/or routing metrics in the MAMs and selects the address vector associated with the best path cost/routing metric for inclusion in the forwarded MAM. Forwarding of the MAM may stop after a node receives the MAM with a hop limit of 0 and/or if the node has already made a forwarding decision for an MAM with the same sequence counter. Moreover, the multicast group leader does not forward the MAM after the MAM is transmitted back to the multicast group leader from a neighboring node.

Next, software application 242 forwards 504 a first unicast message that includes an MJR from each member node in the multicast group to the multicast group leader along a shortest path (i.e., a path with the best routing metric) from the member node to the multicast group leader. For example, software application 242 executing on each member node could generate a MJR that includes an SRH that specifies the shortest path from the member node to the multicast group leader. The shortest path may be selected from address vectors in one or more MAMs received by the member node from the multicast group leader. The SRH could be generated by adding the address of the member node to the front of SRH and appending addresses to the SRH in reverse order from the shortest MAM address vector received by the member node from the multicast group leader. The MJR would then be forwarded by instances of software application 242 executing on nodes along the shortest path.

Software application 242 then forwards 506 a second unicast message that includes an MJA from the multicast group leader to a corresponding member node. For example, software application 242 executing on the multicast group leader could generate the MJA in response to each MJR received by the multicast group leader from a member node in the multicast group. The MJA includes a SRH that is a reverse of the SRH in the MJR received from the member node. The MJA would then be forwarded along nodes in the SRH until the MJA reaches the member node.

Finally, software application 242 declares 508 a node that forwarded the second unicast message as a multicast forwarder in the multicast group. For example, software application 242 executing on each node that forwarded an MJA from the multicast group leader, including the multicast group leader, could declare the node as a multicast forwarder for a predefined duration. This duration could be longer than the periodicity with which the multicast group leader broadcasts new MAMs. Software application 242 executing on the multicast group leader would also maintain a list of multicast forwarders based on declarations by the nodes that forwarded MJAs from the multicast group leader to the member nodes.

Operation 502-508 may be repeated to continue maintaining 510 the multicast group. For example, the multicast group leader could perform operation 502 on a periodic basis to maintain an up-to-date representation of the multicast group and select multicast forwarders in the multicast group. Additional nodes in the mesh network would then perform operations 504-508 in response to the MAM broadcasted in operation 502 to complete the three-way handshake and establish communication within the multicast group.

Figure 6:
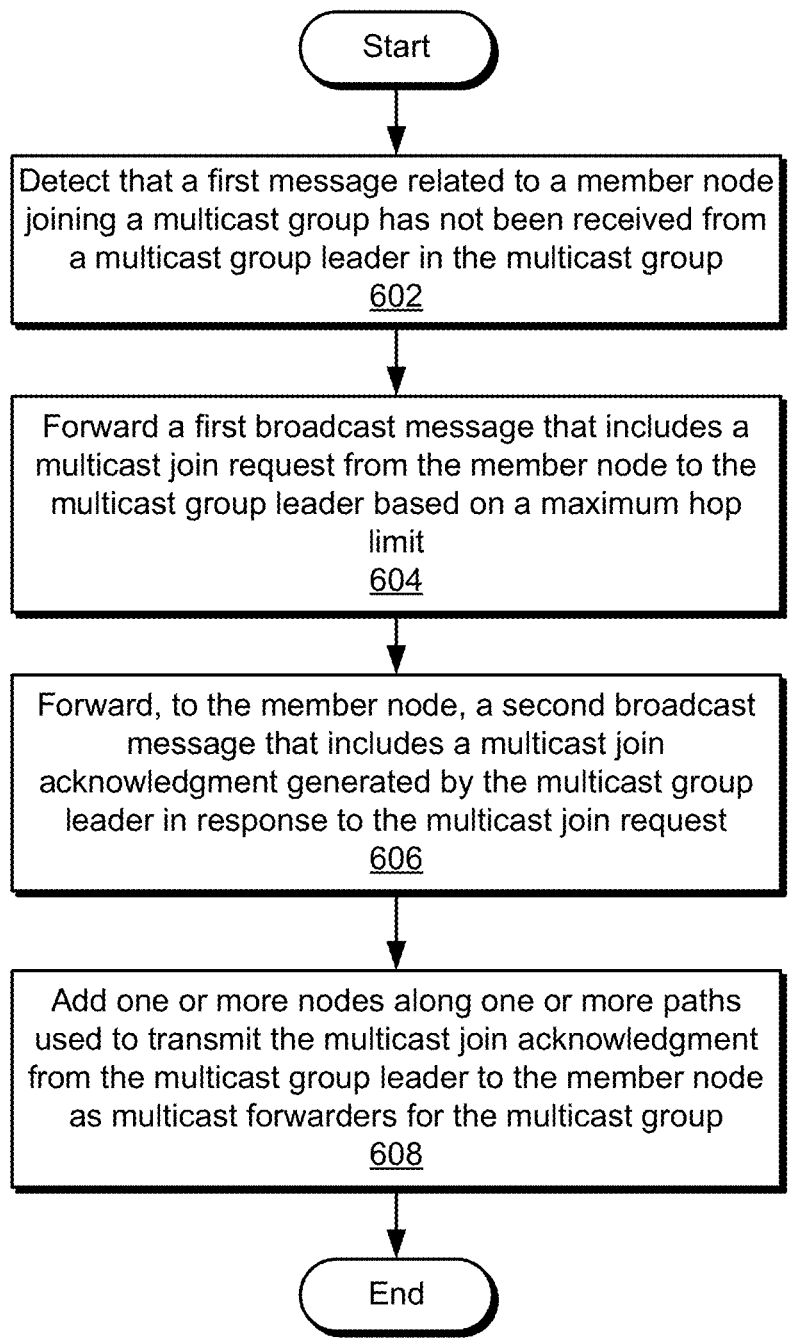
FIG. 6 is a flow diagram of method steps for establishing communications within a multicast group of nodes included in a mesh network, according to other various embodiments.

FIG. 6 is a flow diagram of method steps for establishing communication within a multicast group of nodes included in a mesh, according to other various embodiments. Although the method steps are described in conjunction with the systems of FIGS. 1-4, persons skilled in the art will understand that any system configured to perform the method steps, in any order, is within the scope of the present invention.

As shown, software application 242 detects 602 that a first message related to a member node joining a multicast group has not been received from a multicast group leader in the multicast group. For example, software application 242 executing on the member node could detect the lack of a unicast MJA from the multicast group leader after the member node transmit a unicast MJR to the multicast group leader. In another example, software application 242 executing on the member node could determine that the member node has not received an MAM broadcasted by the multicast group leader. This failure to receive the message may be caused by one or more asymmetric links between the member node and the multicast group leader.

Next, software application 242 forwards 604 a first broadcast message that includes an MJR from the member node to the multicast group leader based on a maximum hop limit. For example, software application 242 executing on the member node could generate a broadcast MJR in response to the lack of MAM or MJA from the multicast group leader. The member node would forward the broadcast MJR to one or more direct neighbors, and each recipient of the broadcast MJR could further forward the broadcast MJR to its direct neighbors until the maximum hop limit is reached.

Software application 242 also forwards 606, to the member node, a second broadcast message that includes an MJA generated by the multicast group leader in response to the MJR. For example, software application 242 executing on the multicast group leader could generate a broadcast MJA in response to the broadcast MJR from the member node. The multicast group leader would forward the broadcast MJA to one or more direct neighbors, and each recipient of the broadcast MJA could further forward the broadcast MJA to its direct neighbors until a maximum hop limit associated with the broadcast MJA is reached.

In some embodiments, the multicast group leader delays generation of the broadcast MJA for a predetermined period to allow for receipt of multiple broadcast MJRs from different member nodes. The multicast group leader then aggregates data related to MJAs for the multiple broadcast MJRs under a single broadcast message, and transmits the single broadcast message to other nodes in the mesh network for propagation to the destination nodes of the MJAs.

Finally, software application adds 608 one or more nodes identified in the MJA from the multicast group leader to the member node as multicast forwarders for the multicast group. For example, software application 242 executing on the member node could use one or more address vectors in the MJA to identify one or more nodes that are included in the path(s). The member node and/or another component of the mesh network could then declare the identified node(s) as multicast forwarders for the multicast group.

In sum, the disclosed techniques use a multicast discovery process to establish communication within a multicast group of nodes included in a mesh network. The multicast discovery process includes a three-way handshake between a multicast group leader in the multicast group and other member nodes in the multicast group. Nodes that are involved in transmitting messages between the multicast group leader and the other member nodes during the three-way handshake are identified as multicast forwarders for the multicast group. When a message fails to be transmitted between a member node and the multicast group leader during the three-way handshake, broadcast transmission of one or more messages in the three-way handshake is performed to find an alternative path between the member node and the multicast group leader.

One technical advantage of the disclosed techniques relative to the prior art is that the disclosed techniques enable a minimum set of multicast forwarders to be identified within a multicast group, where the multicast forwarders in that minimum set are able to connect all member nodes included in the multicast group. Accordingly, the disclosed techniques are able to reduce bandwidth consumption and overall processing overhead typically associated with conventional approaches. The disclosed techniques also transmit unicast messages during the multicast discovery process when possible, which further reduces bandwidth consumption and processing overhead. These technical advantages provide one or more technological improvements over prior art approaches.

1. In some embodiments, a method for establishing communications within a multicast group of nodes included in a mesh network comprises receiving a first unicast message that includes a multicast join request from a member node included in the multicast group, wherein the multicast join request specifies a first shortest path from the member node to a multicast group leader also included in the multicast group, forwarding the first unicast message to the multicast group leader along the first shortest path, forwarding a second unicast message from the multicast group leader to the member node along a second shortest path, wherein the second unicast message includes a multicast join acknowledgment, and declaring a first node as a multicast forwarder in the multicast group, wherein the first node is responsible for forwarding the second unicast message.

2. The method of clause 1, further comprising, prior to receiving the first unicast message, forwarding a first multicast advertisement message from the multicast group leader to one or more direct neighbors of the first node based on a maximum hop limit.

3. The method of clauses 1 or 2, wherein the first multicast advertisement message is forwarded based on a comparison of a first routing metric included in the first multicast advertisement message and a second routing metric included in a second multicast advertisement message received at the first node.

4. The method of any of clauses 1-3, wherein forwarding the first multicast advertisement message from the multicast group leader comprises adding an address associated with the first node to an address vector included in the multicast advertisement message.

5. The method of any of clauses 1-4, wherein forwarding the first multicast advertisement message from the multicast group leader comprises decrementing a hop limit included in the multicast advertisement message prior to forwarding the multicast advertisement message.

6. The method of any of clauses 1-5, wherein the first node is declared a multicast forwarder for a duration of time that is greater than a periodicity of the multicast advertisement message.

7. The method of any of clauses 1-6, further comprising generating a third unicast message that includes the multicast join request from the first node, wherein the multicast join request in the third unicast message specifies a third shortest path from the first node to the multicast group leader, forwarding the third unicast message to the multicast group leader along the third shortest path, and receiving a fourth unicast message that includes the multicast join acknowledgment from the multicast group member, wherein the multicast join acknowledgment is used to establish one or more paths between the first node and one or more other member nodes included in the multicast group.

8. The method of any of clauses 1-7, wherein generating the third unicast message comprises selecting the third shortest path based on one or more path costs in one or more paths included in one or more multicast advertisement messages received by the first node from the multicast group leader.

9. The method of any of clauses 1-8, further comprising adding the first node to a list of multicast forwarders maintained by the multicast group leader.

10. The method of any of clauses 1-9, wherein the second shortest path comprises a path from the multicast group leader to the member node and is a reverse of the first shortest path.

11. In some embodiments, a non-transitory computer readable medium stores instructions that, when executed by a processor, cause the processor to perform the steps of receiving a first unicast message that includes a multicast join request from a member node included in the multicast group, wherein the multicast join request specifies a first shortest path from the member node to a multicast group leader also included in the multicast group, forwarding the first unicast message to the multicast group leader along the first shortest path, forwarding a second unicast message from the multicast group leader to the member node along a second shortest path, wherein the second unicast message includes a multicast join acknowledgment, and declaring a first node as a multicast forwarder in the multicast group, wherein the first node is responsible for forwarding the second unicast message.

12. The non-transitory computer-readable medium of clause 11, wherein the instructions further cause the processor to perform the step of forwarding a first multicast advertisement message from the multicast group leader to one or more direct neighbors of the first node based on a maximum hop limit.

13. The non-transitory computer-readable medium of clauses 11 or 12, wherein forwarding the first multicast advertisement message from the multicast group leader comprises adding an address associated with the first node to an address vector in the multicast advertisement message, updating a path cost in the multicast advertisement message, and decrementing a hop limit in the multicast advertisement message prior to forwarding the multicast advertisement message.

14. The non-transitory computer-readable medium of any of clauses 11-13, wherein forwarding the first multicast advertisement message from the multicast group leader comprises forwarding the first multicast advertisement message after a random forwarding delay.

15. The non-transitory computer-readable medium of any of clauses 11-14, wherein the first node is declared a multicast forwarder for a duration of time that is greater than a periodicity of the multicast advertisement message.

16. The non-transitory computer-readable medium of any of clauses 11-15, wherein the instructions further cause the processor to perform the steps of generating a third unicast message that includes the multicast join request from the first node, wherein the multicast join request in the third unicast message specifies a third shortest path from the first node to the multicast group leader, forwarding the third unicast message to the multicast group leader along the third shortest path, and receiving a fourth unicast message that includes the multicast join acknowledgment from the multicast group member, wherein the multicast join acknowledgment is used to establish one or more paths between the first node and one or more other member nodes included in the multicast group 17. The non-transitory computer-readable medium of any of clauses 11-16, wherein generating the third unicast message comprises selecting the third shortest path based on one or more paths included in one or more multicast advertisement messages received by the first node from the multicast group leader.

18. The non-transitory computer-readable medium of any of clauses 11-17, wherein forwarding the second unicast message comprises obtaining the second shortest path from the second unicast message, and forwarding the second unicast message to a next node included in the second shortest path.

19. The non-transitory computer-readable medium of any of clauses 11-18, wherein the second shortest path comprises a path from the multicast group leader to the member node and is a reverse of the first shortest path.

20. In some embodiments, a system comprises a memory that stores instructions, and a processor that is coupled to the memory and, when executing the instructions, is configured to forward a first multicast advertisement message from a multicast group leader included in a multicast group to one or more direct neighbors in a network based on a maximum hop limit, receive a first unicast message that includes a multicast join request from a member node included in the multicast group, wherein the multicast join request specifies a first shortest path from the member node to the multicast group leader, forward the first unicast message to the multicast group leader along the first shortest path, forward a second unicast message from the multicast group leader to the member node along a second shortest path, wherein the second unicast message includes a multicast join acknowledgment, and declare a first node as a multicast forwarder in the multicast group, wherein the first node is responsible for forwarding the second unicast message.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
  receiving, by a first node in a mesh network, a first unicast message that includes a multicast join request from a member node included in a multicast group of nodes included in the mesh network, wherein the multicast join request specifies a first shortest path from the member node to a multicast group leader also included in the multicast group;
  forwarding, by the first node, the first unicast message to the multicast group leader along the first shortest path;

forwarding, by the first node, a second unicast message from the multicast group leader to the member node along a second shortest path, wherein the second unicast message includes a multicast join acknowledgment; and in response to forwarding the second unicast message, declaring, by the first node to the multicast group leader, the first node as a multicast forwarder in the multicast group for a predefined duration.

2. The method of claim 1, further comprising, prior to receiving the first unicast message, forwarding, by the first node, a first multicast advertisement message from the multicast group leader to one or more direct neighbors of the first node based on a maximum hop limit.

3. The method of claim 2, wherein the first multicast advertisement message is forwarded based on a comparison of a first routing metric included in the first multicast advertisement message and a second routing metric included in a second multicast advertisement message received at the first node.

4. The method of claim 2, wherein forwarding the first multicast advertisement message from the multicast group leader comprises adding, by the first node, an address associated with the first node to an address vector included in the first multicast advertisement message.

5. The method of claim 2, wherein forwarding the first multicast advertisement message from the multicast group leader comprises decrementing a hop limit included in the first multicast advertisement message prior to forwarding the first multicast advertisement message.

6. The method of claim 2, wherein the predefined duration is greater than a periodicity of the first multicast advertisement message.

7. The method of claim 1, further comprising:
generating, by the first node, a third unicast message that includes the multicast join request, wherein the multicast join request in the third unicast message specifies a third shortest path from the first node to the multicast group leader;
forwarding, by the first node, the third unicast message to the multicast group leader along the third shortest path; and
receiving, by the first node, a fourth unicast message that includes the multicast join acknowledgment,
wherein the multicast join acknowledgment is used to establish one or more paths between the first node and one or more other member nodes included in the multicast group.

8. The method of claim 7, wherein generating the third unicast message comprises selecting the third shortest path based on one or more path costs in one or more paths included in one or more multicast advertisement messages received by the first node from the multicast group leader.

9. The method of claim 1, further comprising adding the first node to a list of multicast forwarders maintained by the multicast group leader.

10. The method of claim 1, wherein the second shortest path comprises a path from the multicast group leader to the member node and is a reverse of the first shortest path.

11. A non-transitory computer-readable medium storing instructions that, when executed by a processor of a first node in a mesh network, cause the processor to perform the steps of:
receiving a first unicast message that includes a multicast join request from a member node included in a multicast group of nodes included in the mesh network, wherein the multicast join request specifies a first shortest path from the member node to a multicast group leader also included in the multicast group;

forwarding the first unicast message to the multicast group leader along the first shortest path;

forwarding a second unicast message from the multicast group leader to the member node along a second shortest path, wherein the second unicast message includes a multicast join acknowledgment; and in response to forwarding the second unicast message, declaring, to the multicast group leader, the first node as a multicast forwarder in the multicast group for a predefined duration.

12. The non-transitory computer-readable medium of claim 11, wherein the instructions further cause the processor to perform the step of forwarding a first multicast advertisement message from the multicast group leader to one or more direct neighbors of the first node based on a maximum hop limit.

13. The non-transitory computer-readable medium of claim 12, wherein forwarding the first multicast advertisement message from the multicast group leader comprises:
adding an address associated with the first node to an address vector in the first multicast advertisement message,
updating a path cost in the first multicast advertisement message, and
decrementing a hop limit in the first multicast advertisement message prior to forwarding the first multicast advertisement message.

14. The non-transitory computer-readable medium of claim 12, wherein forwarding the first multicast advertisement message from the multicast group leader comprises forwarding the first multicast advertisement message after a random forwarding delay.

15. The non-transitory computer-readable medium of claim 12, wherein the predefined duration is greater than a periodicity of the first multicast advertisement message.

16. The non-transitory computer-readable medium of claim 11, wherein the instructions further cause the processor to perform the steps of:
generating a third unicast message that includes the multicast join request, wherein the multicast join request in the third unicast message specifies a third shortest path from the first node to the multicast group leader;
forwarding the third unicast message to the multicast group leader along the third shortest path; and
receiving a fourth unicast message that includes the multicast join acknowledgment,
wherein the multicast join acknowledgment is used to establish one or more paths between the first node and one or more other member nodes included in the multicast group.

17. The non-transitory computer-readable medium of claim 16, wherein generating the third unicast message comprises selecting the third shortest path based on one or more paths included in one or more multicast advertisement messages received by the first node from the multicast group leader.

18. The non-transitory computer-readable medium of claim 11, wherein forwarding the second unicast message comprises:
obtaining the second shortest path from the second unicast message; and
forwarding the second unicast message to a next node included in the second shortest path.

19. The non-transitory computer-readable medium of claim 11, wherein the second shortest path comprises a path from the multicast group leader to the member node and is a reverse of the first shortest path.

20. A node in mesh network, the node comprising:
a memory that stores instructions, and
a processor that is coupled to the memory and, when executing the instructions, is configured to:
   forward a first multicast advertisement message from a multicast group leader included in a multicast group of nodes included in the mesh network to one or more direct neighbors in a network based on a maximum hop limit;
   receive a first unicast message that includes a multicast join request from a member node included in the multicast group, wherein the multicast join request specifies a first shortest path from the member node to the multicast group leader;
   forward the first unicast message to the multicast group leader along the first shortest path;
   forward a second unicast message from the multicast group leader to the member node along a second shortest path, wherein the second unicast message includes a multicast join acknowledgment; and
   in response to forwarding the second unicast message, declare, to the multicast group leader, the node as a multicast forwarder in the multicast group for a predefined duration.

* * * * *